(12) United States Patent
Sato et al.

(10) Patent No.: US 10,498,924 B2
(45) Date of Patent: Dec. 3, 2019

(54) COMMUNICATION DEVICE AND PRINTER

(71) Applicant: BROTHER KOGYO KABUSHIKI KAISHA, Nagoya-shi, Aichi-ken (JP)

(72) Inventors: Shoji Sato, Okazaki (JP); Satoru Arakane, Nagoya (JP)

(73) Assignee: BROTHER KOGYO KABUSHIKI KAISHA, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/863,198

(22) Filed: Jan. 5, 2018

(65) Prior Publication Data

US 2018/0288276 A1 Oct. 4, 2018

(30) Foreign Application Priority Data

Mar. 29, 2017 (JP) ................................. 2017-066118

(51) Int. Cl.
*H04N 1/40* (2006.01)
*B41J 2/045* (2006.01)
*G06K 15/10* (2006.01)

(52) U.S. Cl.
CPC .......... *H04N 1/4005* (2013.01); *B41J 2/0451* (2013.01); *B41J 2/04541* (2013.01);
(Continued)

(58) Field of Classification Search
CPC .. B41J 2/0451; B41J 2/04531; B41J 2/04541; B41J 2/04563; B41J 2/04581; B41J 2/04586; B41J 2/04588; H04B 1/38; H04B 1/40; H04L 7/0008; H04L 7/0012; H04L 7/0029; H04N 1/4005; H04N 2201/0082; G06K 15/02; G06K 15/024; G06K 15/102

USPC ................ 375/219–222, 257, 354, 356, 358; 347/10, 17, 20; 370/282, 350, 503; 455/24, 502, 69

See application file for complete search history.

(56) References Cited

U.S. PATENT DOCUMENTS 5,864,253 A * 1/1999 Katakura ................ H04L 25/45
326/96
5,867,541 A * 2/1999 Tanaka .................. H04L 7/0337
370/516

(Continued)

FOREIGN PATENT DOCUMENTS

JP 2006-060808 A 3/2006
JP 2009-065399 A 3/2009
(Continued)

*Primary Examiner* — Young T Tse

(74) *Attorney, Agent, or Firm* — Scully, Scott, Murphy & Presser, P.C.

(57) ABSTRACT

A communication device includes a transmitter, a receiver, a clock signal line, a data signal line, a memory and a controller. The controller is configured to control the transmitter to transmit the clock signal and the confirmation signal where at least one of the clock signal and the confirmation signal are transmitted at a reference waveform condition and determine whether the transmitter receives an acquisition signal. The controller is configured to, if the transmitter does not receive the acquisition signal, control the transmitter to transmit the clock signal and the confirmation signal using a different waveform condition for at least one of the clock signal and the confirmation signal and if the transmitter receives the acquisition signal, update condition change information.

21 Claims, 9 Drawing Sheets

(52) U.S. Cl.
CPC ....... *B41J 2/04551* (2013.01); *B41J 2/04563* (2013.01); *B41J 2/04581* (2013.01); *B41J 2/04586* (2013.01); *B41J 2/04588* (2013.01); *G06K 15/102* (2013.01); *H04N 2201/0082* (2013.01)

(56) References Cited

U.S. PATENT DOCUMENTS

| | | | |
|---|---|---|---|
| 2006/0034358 A1 | 2/2006 | Okamura | |
| 2008/0137790 A1* | 6/2008 | Cranford | H04L 7/0004 375/357 |
| 2008/0163000 A1* | 7/2008 | McKim | G01R 31/318594 714/34 |
| 2010/0257436 A1* | 10/2010 | Asauchi | B41J 2/17513 714/805 |
| 2014/0092155 A1* | 4/2014 | Suzuki | B41J 2/04541 347/14 |

FOREIGN PATENT DOCUMENTS

| | | |
|---|---|---|
| JP | 2011-075387 A | 4/2011 |
| JP | 2013-159105 A | 8/2013 |

\* cited by examiner

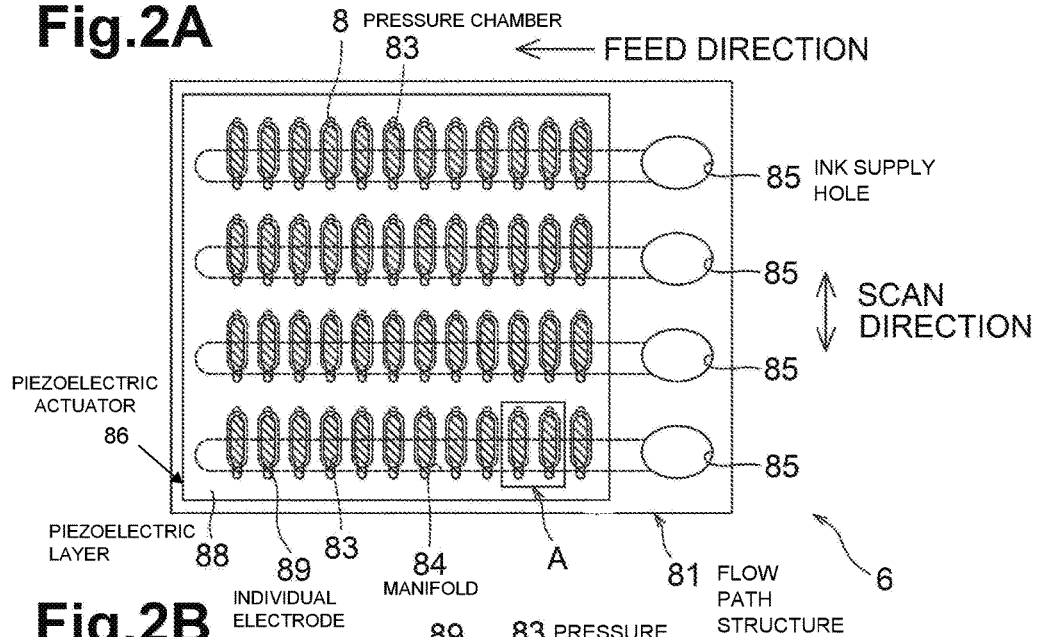
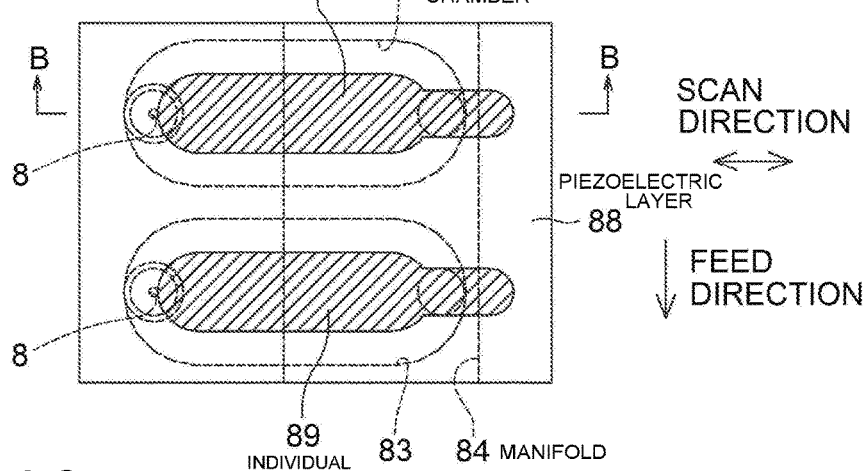
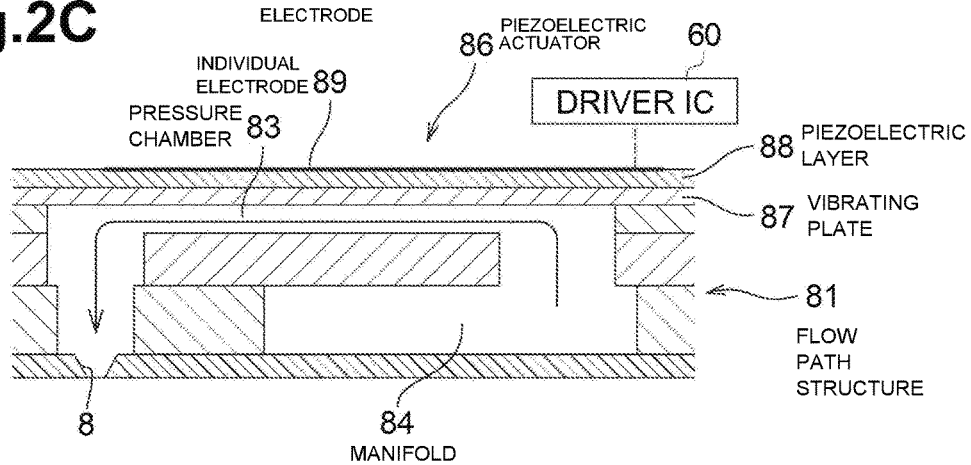

Fig.5A

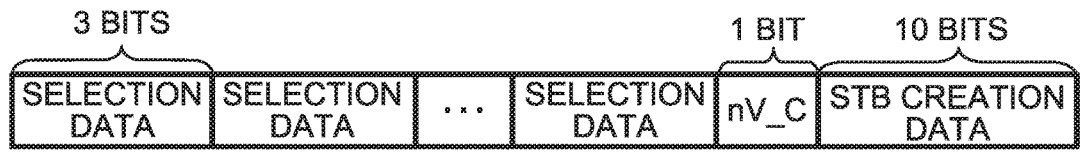

Fig.5B

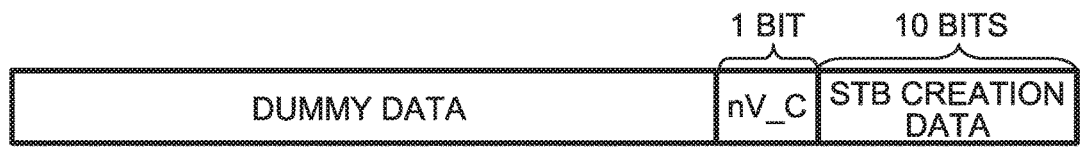

Fig.5C

| OPERATION MODE | nV_C | OUTPUT (CLK) FROM RECEPTION CIRCUIT 61a | OUTPUT (FIRE) FROM RECEPTION CIRCUIT 61b | OUTPUT (SIN) FROM RECEPTION CIRCUIT 61c | OUTPUT FROM CHECK CIRCUIT |
|---|---|---|---|---|---|
| NORMAL MODE | L | — | — | — | VTEMP |
| ABNORMALITY CHECK MODE | H | L | L | L | L |
| ABNORMALITY CHECK MODE | H | H | H | H | L |
| ABNORMALITY CHECK MODE | H | L | L | H | VTEMP |
| ABNORMALITY CHECK MODE | H | L | H | L | VTEMP |
| ABNORMALITY CHECK MODE | H | L | H | H | VTEMP |
| ABNORMALITY CHECK MODE | H | H | L | L | VTEMP |
| ABNORMALITY CHECK MODE | H | H | L | H | VTEMP |
| ABNORMALITY CHECK MODE | H | H | H | L | VTEMP |

Fig.5D

| WAVEFORM CONDITION | DRIVING CURRENT |
|---|---|
| SIN WAVEFORM CONDITION | DRIVING CURRENT A |
| CLK WAVEFORM CONDITION 1 | DRIVING CURRENT 1 |
| CLK WAVEFORM CONDITION 2 | DRIVING CURRENT 2 |
| CLK WAVEFORM CONDITION 3 | DRIVING CURRENT 3 |
| CLK WAVEFORM CONDITION 4 | DRIVING CURRENT 4 |
| ⋮ | ⋮ |
| CLK WAVEFORM CONDITION 10 | DRIVING CURRENT 10 |

Fig.5E

| CLK WAVEFORM CONDITION | TEMPERATURE DATA | OBTAINING-TIME INFORMATION |
|---|---|---|
| CLK WAVEFORM CONDITION 1 | TEMPERATURE DATA A | DECEMBER 11, 2016 AT 20:30 |
| CLK WAVEFORM CONDITION 2 | TEMPERATURE DATA B | MARCH 11, 2017 AT 15:30 |
| CLK WAVEFORM CONDITION 4 | TEMPERATURE DATA C | FEBRUARY 11, 2017 AT 13:00 |
| CLK WAVEFORM CONDITION 5 | TEMPERATURE DATA D | APRIL 3, 2010 AT 10:30 |
| ⋮ | ⋮ | ⋮ |

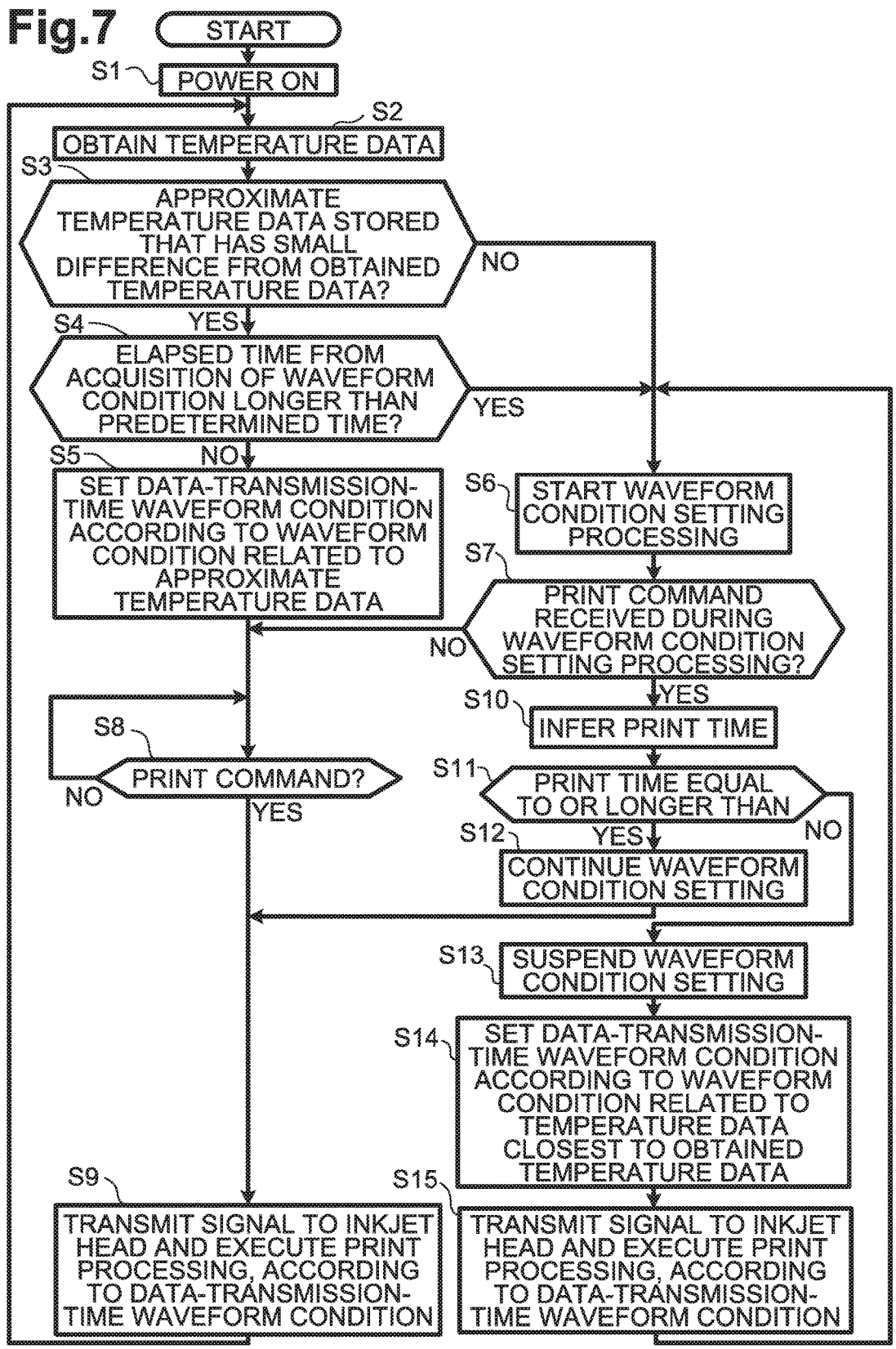

COMMUNICATION DEVICE AND PRINTER

CROSS-REFERENCE TO RELATED APPLICATION

This application claims priority from Japanese Patent Application No. 2017-066118 filed on Mar. 29, 2017, the content of which is incorporated herein by reference in its entirety.

FIELD OF DISCLOSURE

The present invention relates to a communication device and a printer including the same.

BACKGROUND

In various fields, conventional communication devices have been used that transmit a data signal from a transmission circuit to a reception circuit in synchronization with a clock signal. For example, an inkjet printer that transmits a data signal to an inkjet head in synchronization with a clock signal to control the inkjet head is known.

SUMMARY

When a clock signal or data signal is transmitted from a transmission circuit to a reception circuit, the waveform of the signal may change in response to, for example, a change in an environment in which the communication device is used. If, for example, the environment becomes a high-temperature environment, the resistances of circuits in the communication device are increased, which may change the waveform of the clock signal or data signal. This change in the waveform of the clock signal or data signal may prevent the reception circuit from normally acquiring the data signal.

In view of this, the present invention provides a communication device that can reduce the possibility that a reception circuit fails to acquire a data signal and also provides a recording apparatus equipped with the communication device.

To solve the above problem, a communication device in the present invention includes a transmitter, a receiver configured to receive a confirmation signal transmitted from the transmitter, the receiver configured to transmit an acquisition signal toward the transmitter if receiving the confirmation signal and a clock signal line connecting the transmitter to the receiver, the clock signal line through which a clock signal is transmitted from the transmitter toward the receiver. The communication device includes a data signal line connecting the transmitter to the receiver, the data signal line through which a data signal is transmitted from the transmitter toward the receiver and a memory configured to store a plurality of clock waveform conditions related to a waveform of the clock signal, at least one data waveform condition related to a waveform of the data signal, and condition change information for changing at least one of the plurality of clock waveform conditions and the at least one data waveform condition. The communication device includes a controller configured to, during setting at least one of the clock signal to one of the plurality of clock waveform conditions and the data signal to one of the at least one of data waveform condition, control the transmitter to transmit the clock signal and the confirmation signal, where at least one of the clock signal and the confirmation signal are transmitted at a reference waveform condition and determine whether the transmitter receives the acquisition signal transmitted from the receiver. The controller is configured to, if the transmitter does not receive the acquisition signal, control the transmitter to transmit the clock signal and the confirmation signal using a different waveform condition for at least one of the clock signal and the confirmation signal and if the transmitter receives the acquisition signal, update the condition change information.

According to the present invention, if a receiver fails to normally acquire a confirmation signal, the waveform condition for at least one of a data signal and a clock signal, is changed. This can reduce the possibility that the receiver fails to acquire a data signal.

BRIEF DESCRIPTION OF THE DRAWINGS

FIG. 2A is a plan view of an inkjet head. FIG. 2B is an enlarged view of a portion indicated by IIA in FIG. 2A. FIG. 2C is a cross-sectional view taken along line IIB-IIB in FIG. 2B.

FIG. 5A illustrates a waveform selection signal. FIG. 5B illustrates a check signal. FIG. 5C illustrates the operation modes of a check circuit. FIG. 5D illustrates a waveform condition table. FIG. 5E illustrates a waveform condition setting history table.

FIG. 7 is a flowchart illustrating the processing operation of a transmission control circuit.

DETAILED DESCRIPTION

Figure 1:
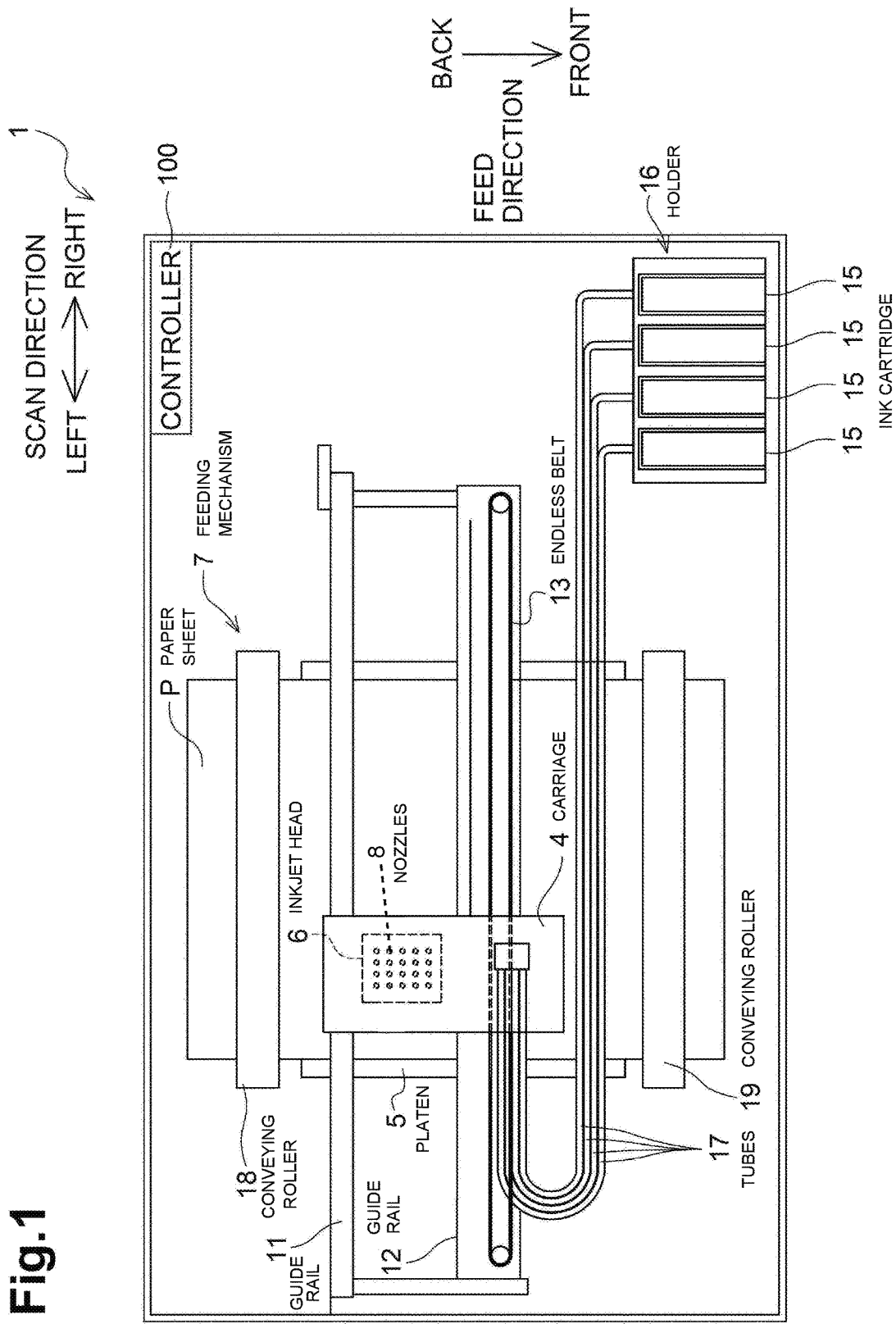
FIG. 1 is a schematic plan view of an inkjet printer.

An inkjet printer 1 (referred to below simply as the printer 1) will be described below as an example of a recording apparatus equipped with the communication device in the present invention. As illustrated in FIG. 1, the printer 1 includes a carriage 4, a platen 5, an inkjet head 6 (referred to below simply as the head 6), a feeding mechanism 7, and a controller 100, and other components.

The carriage 4 is supported by two guide rails 11 and 12, which extends in a left-and-right direction (sometimes also referred to below as the scan direction), in such a way that the carriage 4 is bidirectionally movable. An endless belt 13 is linked to the carriage 4. When the endless belt 13 is driven by a carriage motor 14 (see FIG. 3), the carriage 4 moves in the scan direction along the guide rails 11 and 12. A paper sheet P, which is a recording medium, is placed on the platen 5.

The head 6, which is mounted in the carriage 4, moves in the scan direction together with the carriage 4. The head 6 is connected to a holder 16, in which ink cartridges 15 for four colors (black, yellow, cyan, and magenta) are mounted, with tubes 17. The head 6 has a plurality of nozzles 8 formed in its bottom surface. Each nozzle 8 expels ink supplied from relevant ink cartridge 15 toward the paper sheet P placed on the platen 5. The structure of the head 6 will be described below in detail.

As illustrated in FIG. 2A, the head 6 has a flow path structure 81 and a piezoelectric actuator 86 placed on the upper surface of the flow path structure 81. In the flow path structure 81, a plurality of nozzles 8 and a plurality of pressure chambers 83 are formed so that each pressure chamber 83 communicates with one of the plurality of nozzles 8.

As illustrated in FIG. 2C, the flow path structure 81 has a structure in which four plates are laminated. The plurality of nozzles 8 are formed in the button surface of the flow path structure 81. Referring again to FIG. 2A, the plurality of nozzles 8 are arranged in four rows in the direction in which the paper sheet P is fed (the direction will be referred to below as the feed direction), the direction being orthogonal to the scan direction. Each row of nozzles 8 corresponds to one of the four ink colors. As with the plurality of nozzles 8, the plurality of pressure chambers 83 are arranged in four rows.

As illustrated in FIGS. 2A and 2B, four manifolds 84 are formed in the flow path structure 81 so as to extend in the feed direction. Each of the four manifolds 84 supplies ink in one of the four colors to the relevant pressure chamber row, which is one of the four pressure chamber rows. The four manifolds 84 are connected to four ink supply holes 85 formed in the upper surface of the flow path structure 81. Ink in each of the four colors is supplied to one of the four ink supply holes 85 from the relevant ink cartridge 15 (one of the four ink cartridges 15 illustrated in FIG. 1) in the holder 16. Due to this structure, a plurality of individual flow paths are formed in the flow path structure 81, each of which branches from the relevant manifold 84, passes through one pressure chamber 83, and leads to the relevant nozzle 8.

Referring again to FIG. 2C, the piezoelectric actuator 86 includes a vibrating plate 87, which covers the plurality of pressure chambers 83, a piezoelectric layer 88 placed on the upper surface of the vibrating plate 87, and a plurality of individual electrodes 89, each of which corresponds to one of the plurality of pressure chamber 83. The plurality of individual electrode 89, which are positioned on the upper surface of the piezoelectric layer 88, are electrically connected to a driver integrated circuit (IC) 60 that drives the piezoelectric actuator 86.

The driver IC 60 is connected to the controller 100. The driver IC 60 creates driving signals having pulse-shaped driving waveforms according to various signals transmitted from the controller 100. The driver IC 60 then supplies the created driving signals to the plurality of individual electrodes 89 of the piezoelectric actuator 86. That is, the driver IC 60 switches the potential of each individual electrode 89 between ground potential and a predetermined driving potential equivalent to the height of the pulse, according to the driving waveform. Details of the driver IC 60 will be given later.

Next, the action of the piezoelectric actuator 86 during the expelling of ink will be described. When a driving signal is supplied from the driver IC 60 to one individual electrode 89 and a driving potential is thereby given to the individual electrode 89, a potential difference occurs between the individual electrode 89 to which the driving potential has been given and the vibrating plate 87 functioning as a common electrode held at ground potential. Accordingly, the piezoelectric layer 88 sandwiched between the individual electrode 89 and the vibrating plate 87 causes a potential difference, generating a piezoelectric deformation in the piezoelectric layer 88 sandwiched therebetween. This piezoelectric deformation in the piezoelectric layer 88 changes the volume of the pressure chamber 83, giving pressure (expelling energy) to ink in the pressure chamber 83. At that time, ink droplets are expelled from the nozzle 8 communicating with the pressure chamber 83 toward the paper sheet P.

In this embodiment, a piezoelectric element (piezoelectric layer) is used as a driving element (equivalent to the recording element in the present invention) from which ink droplets are expelled from the nozzle 8. However, the driving element is not limited to a piezoelectric element. For example, in a method in which a heat generating body heats ink to cause film boiling, and energy generated at that time is then used to expel ink droplets from the nozzle 8, the heat generating body may be used as the driving element.

The printer 1 in this embodiment is structured so that the size (volume) of a droplet to be expelled from each nozzle 8 is selected from six sizes to make a multi-tone representation, achieving high-quality printing. Specifically, one operation mode is selectively applied to a single nozzle 8; the one operation mode is selected from a total of six types of operation modes, which are a non-expelling mode, in which droplets are not expelled, and five types of expelling modes, in each of which droplets have a different volume.

Referring again to FIG. 1, the feeding mechanism 7 has two conveying rollers 18 and 19 placed so as to sandwich the platen 5 in the forward-backward direction. The two conveying rollers 18 and 19 are driven synchronously with each other by a feed motor 20 (see FIG. 3). When the two conveying rollers 18 and 19 are driven by the feed motor 20, the paper sheet P placed on the platen 5 is fed in the feed direction orthogonal to the scan direction.

Figure 3:
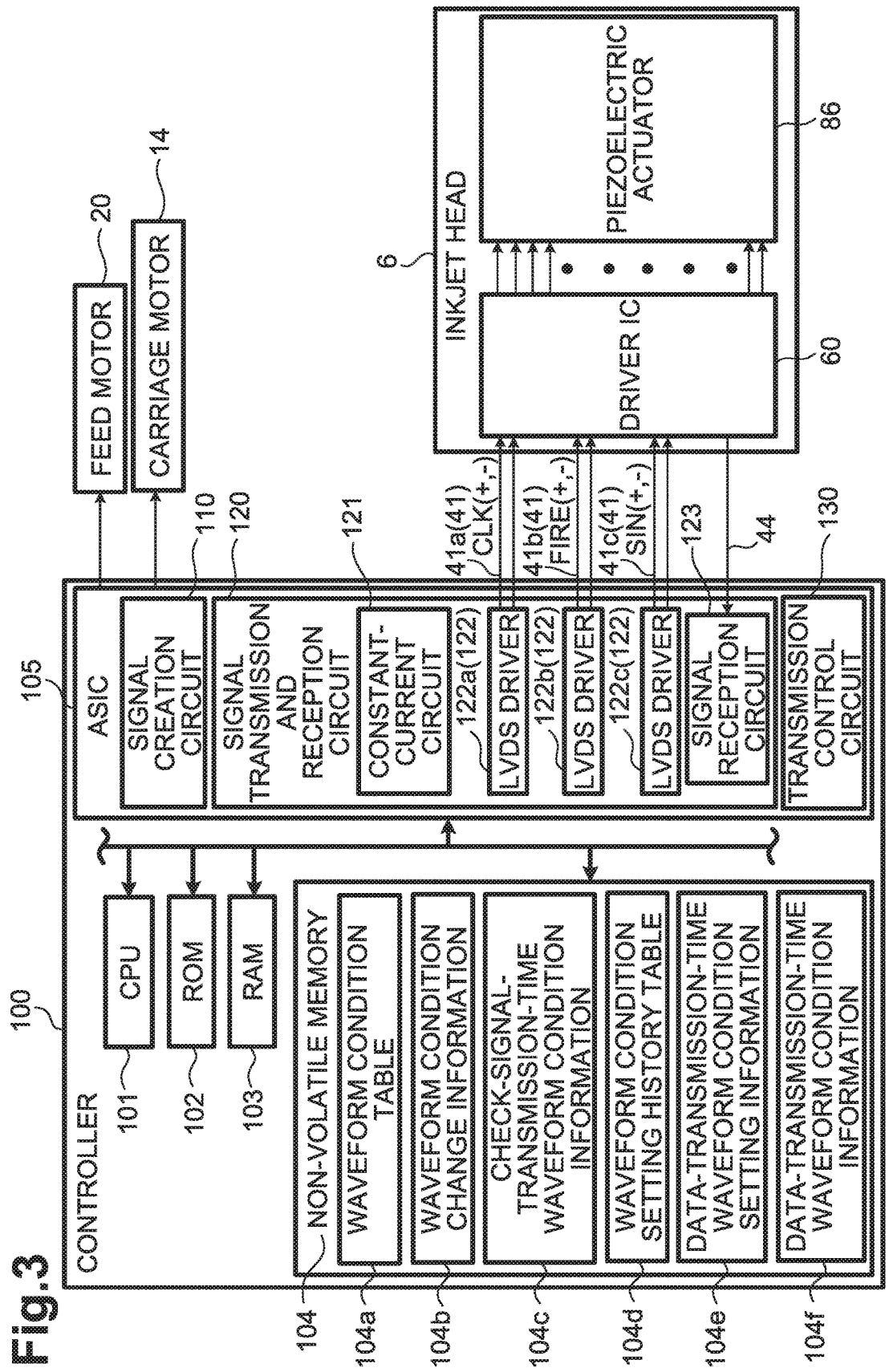
FIG. 3 is a block diagram illustrating the electrical structure of the inkjet printer.

As illustrated in FIG. 3, the controller 100 has a central processing unit (CPU) 101, a read-only memory (ROM) 102, a random-access memory (RAM), 103, a non-volatile memory 104, an application-specific integrated circuit (ASIC) 105 including various types of control circuits, and the like. The ROM 102 stores programs for the ASIC 105 executed by the CPU 101 and, various types of fixed data for the functionality of the ASIC 105 preset via a hardware (not illustrated), and the like. The RAM 103 temporarily stores data (such as, for example, image data related to an image to be printed on a paper sheet P) needed to execute programs. The non-volatile memory 104 stores various types of information. The controller 100 is connected to external apparatuses (not illustrated) such as personal computers (PCs) so that data communication is possible.

The ASIC 105 is controlled by the CPU 101 executing programs stores in the ROM 102 to perform various types of processing including printing to a paper sheet P. In print processing (equivalent to recording processing in the present invention), for example, the controller 100 controls the head 6, carriage motor 14, and the like to have them print an image or the like on the paper sheet P, in response to a print command received from an external apparatus such as a PC. Specifically, the controller 100 causes an ink expelling operation and a feed operation to be alternately performed. In the ink expelling operation, ink is expelled while the carriage 4 and head 6 are being moved together in the scan direction. In the feed operation, the paper sheet P is fed in the feed direction by a predetermined amount by the conveying rollers 18 and 19.

Next, data transmission processing will be described that is performed by the controller 100 between it and the head 6. Although an example in which the ASIC 105 performs data transmission processing will be described below, the present invention is not limited to this example. For example, only a CPU or a combination of a CPU and an ASIC may perform processing. Alternatively, functions may be shared among two or more CPUs or two or more ASICs to implement processing.

The ASIC 105 transmits various types of signals to the driver IC 60 in the head 6 through signal line pairs 41a to 41c to control the expelling operation and the like executed by the head 6. Signals transmitted from the ASIC 105 to the driver IC 60 include a clock signal CLK, a waveform signal FIRE, a waveform selection signal SIN, a check signal CHECK, and the like. The clock signal CLK is a data transfer clock signal transmitted from the ASIC 105 to the driver IC 60. The waveform signal FIRE is a serial signal obtained by serializing six types of waveform data corresponding to the six types of operation modes described above.

The waveform selection signal SIN is a serial signal including selection data (3-bit data) used to have the driver IC 60 select one type of waveform data from the six types of waveform data included in the waveform signal FIRE for each nozzle 8. Although described later in detail, the check signal CHECK is a signal transmitted from the ASIC 105 to the driver IC 60 to check whether there is an abnormality in data transfer between the ASIC 105 and the driver IC 60.

Figure 4:
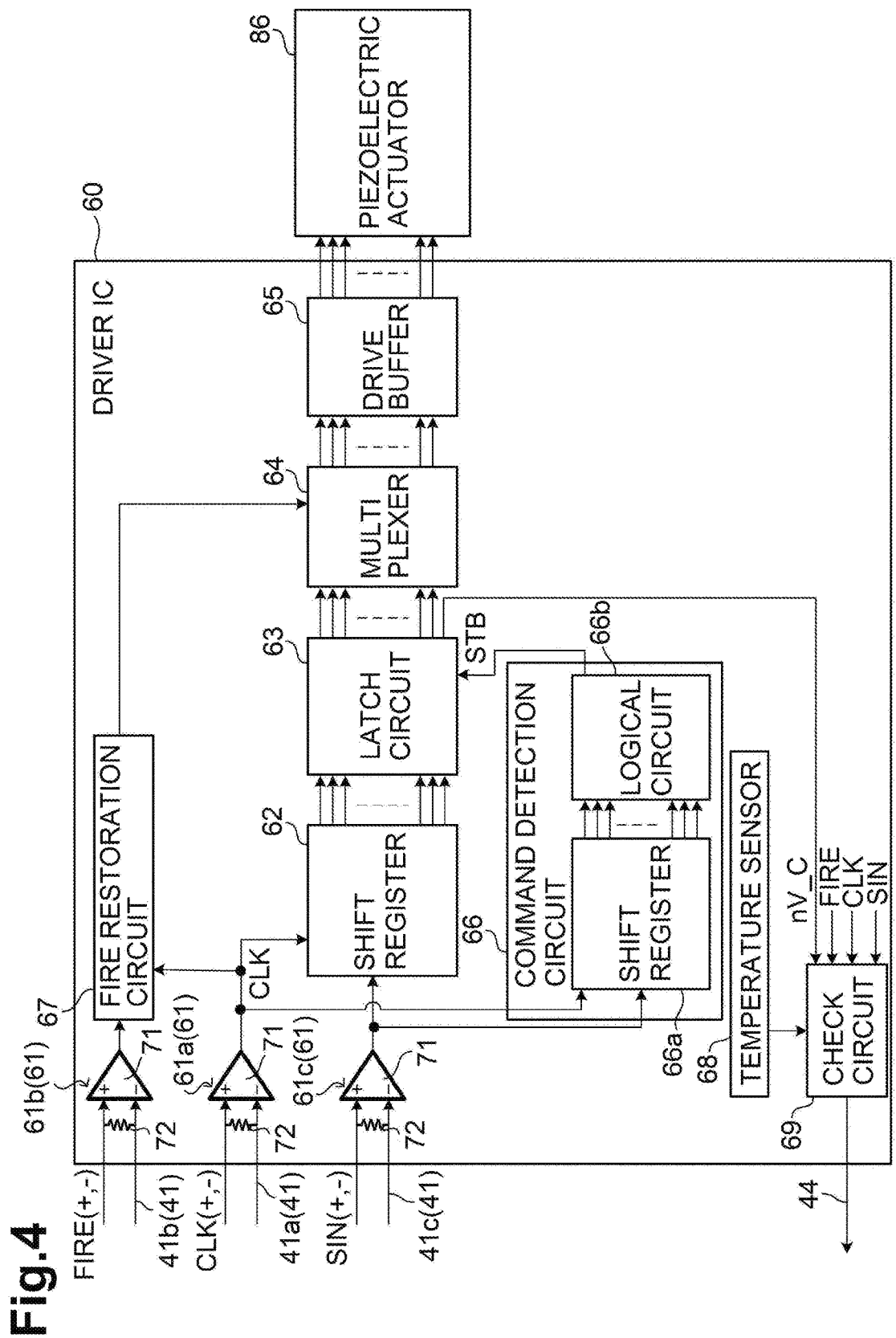
FIG. 4 is a block diagram illustrating the electrical structure of a driver IC.

The waveform selection signal SIN needs as many selection data items as there are nozzles 8 in the head 6, so a very large amount of selection data is needed. In this embodiment, therefore, various signals including this waveform selection signal SIN are transferred in a low-voltage differential signaling (LVDS) method, by which high-speed transfer is possible. Specifically, these signals are transmitted as pulse-shaped differential signals from the ASIC 105 through the signal line pairs 41a to 41c to the driver IC 60. In FIGS. 3 and 4, the differential signals for the clock signal CLK are indicated as CLK (+, −), the differential signals for the waveform signal FIRE are indicated as FIRE (+, −), and the differential signals for waveform selection signal SIN are indicated as SIN (+, −). Although described later in detail, in transmission of the check signal CHECK from the ASIC 105 to the driver IC 60, the signal line pair 41c through which the waveform selection signal SIN is transmitted is used. Therefore, the differential signals for the check signal CHECK are not illustrated.

In the differential method, opposite-phase signals (H signal and L signal) are entered into two signal lines. The differential method features that resistance to noise is high and a signal can be transferred at a low voltage by reducing the amplitude of the signal, unlike a single end method in which only one signal line is used to enter a signal. Since, in the differential method, the amplitude of a signal can be reduced as described above, a time required to make a switchover between the H signal and the L signal can be shortened. As a result, it is possible to increase the frequency of the signal for high-speed data transfer. The driver IC 60 and various types of control circuits related to data transfer by the ASIC 105 will be described below in detail.

The ASIC 105 has a signal creation circuit 110, a signal transmission and reception circuit 120, and a transmission control circuit 130.

The signal creation circuit 110 creates a clock signal CLK, waveform signal FIRE, waveform selection signal SIN, and check signal CHECK and outputs these created signals to the signal transmission and reception circuit 120. Specifically, the non-volatile memory 104 stores six types of waveform data corresponding to the above six types of operation modes. The signal creation circuit 110 creates the waveform signal FIRE according to the six types of waveform data stored in the non-volatile memory 104.

In the creation of the waveform selection signal SIN, the signal creation circuit 110 creates selection data for each nozzle 8 at intervals of an expelling cycle, according to image data eligible for printing, the image data being stored in the RAM 103. The selection data created by the signal creation circuit 110 is six types of selection data formed by a combination of three-bit data items, enabling the six types of waveform data (operation modes) to be distinguished. The three-bit value of each selection data item includes at least one H (1) and one L (0). In the selection data corresponding to waveform data in the non-expelling mode, for example, the values of all bits are L.

The signal creation circuit 110 then adds mode switching data nV_C and STB creation data to the combination of the selection data items corresponding to all nozzles 8, as illustrated in FIG. 5A. The resulting data is the waveform selection signal SIN. This waveform selection signal SIN is created at intervals of the expelling cycle.

As mentioned above, the waveform selection signal SIN and check signal CHECK are transmitted to the driver IC 60 through the same signal line pair 41c. Therefore, the mode switching data nV_C is one-bit data used to detect whether the signal received through the signal line pair 41c is a waveform selection signal SIN or check signal CHECK. Although described later, the check signal CHECK also includes this mode switching data nV_C. The value of the mode switching data nV_C in the waveform selection signal SIN is L, but the value of the mode switching data nV_C in the check signal CHECK is H. The STB creation data is used to create an STB signal, which will be described later, in the driver IC 60. The STB creation data includes more bits than selection data (the STB creation data is, for example, 10-bit data). The values of all bits in the STB creation data are H so that the STB creation data is distinguished from selection data.

As illustrated in FIG. 5B, the check signal CHECK is data having the same number of bits as the waveform selection signal SIN; the check signal CHECK is composed of dummy data, the mode switching data nV_C described above, and the STB creation data described above. The dummy data has the same number of bits as the combination of selection data items described above. The values of all bits in the dummy data are L.

The signal transmission and reception circuit 120 has a constant-current circuit 121, an LVDS drivers 122a to 122c, and a signal reception circuit 123. The constant-current circuit 121 outputs a predetermined constant current to the LVDS drivers 122a to 122c. The constant-current circuit 121 can adjust the current value of a constant current to be output and can also set the current value of the constant current to be output for each of the LVDS drivers 122a to 122c. In this embodiment, the constant-current circuit 121 can output currents having 10 levels of current values. A difference between the value of a current at any one level and the value of a current at a next level is constant.

The LVDS driver 122a corresponds to the clock signal CLK. The LVDS driver 122a receives the constant current from the constant-current circuit 121 and outputs the constant current to each signal line of the signal line pairs 41a. The LVDS driver 122a also changes the orientation of the constant current according to the clock signal CLK output from the signal creation circuit 110. That is, the LVDS driver 122a outputs the clock signal CLK, which is a serial signal output from the signal creation circuit 110, to the signal line pair 41a as a differential signal.

Similarly, the LVDS driver 122b, which corresponds to the waveform signal FIRE, receives the waveform signal FIRE from the signal creation circuit 110 and outputs the waveform signal FIRE to the signal line pair 41b as a differential signal. The LVDS driver 122c, which corresponds to the waveform selection signal SIN and check signal CHECK, receives the waveform selection signal SIN and check signal CHECK output from the signal creation circuit 110 and outputs these signals to the signal line pair 41c as differential signals. In the description below, when the LVDS drivers 122a to 122c are not distinguished, they will be collectively referred to as the LVDS drivers 122. Similarly, when the signal line pairs 41a to 41c are not distinguished, they will be collectively referred to as the signal line pairs 41.

The signal reception circuit 123 receives a signal transmitted from the driver IC 60 through one signal line 44 in a single end method. The method of transferring a signal from the driver IC 60 to the signal reception circuit 123 is not limited to a single end method, and may be an LVDS method.

The transmission control circuit 130 controls the signal creation circuit 110 and signal transmission and reception circuit 120. The transmission control circuit 130 controls, for example, the signal transmission and reception circuit 120 to execute processing in which a clock signal CLK is transmitted through the signal line pair 41a and a waveform selection signal SIN and waveform signal FIRE synchronous with the clock signal CLK are transmitted through the signal line pairs 41b and 41c, respectively.

Next, the driver IC 60 will be described in detail with reference to FIG. 4. The driver IC 60 includes reception circuits 61a to 61c, a shift register 62, a latch circuit 63, a multiplexer 64, a drive buffer 65, a command detection circuit 66, a FIRE restoration circuit 67, a temperature sensor 68, and a check circuit 69.

The reception circuit 61a, which corresponds to the clock signal CLK, receives the clock signal CLK that has been transmitted from the LVDS driver 122a through the signal line pair 41a. Specifically, the reception circuit 61a has an LVDS buffer 71 and a terminating resistor 72. The terminating resistor 72 is connected across the signal line pair 41a to convert currents flowing in the signal line pair 41a to voltages. The LVDS buffer 71 has a non-inverted input terminal (positive terminal) to which one signal line of the signal line pair 41a is connected, and also has an inverted input terminal (negative terminal) to which the other signal line of the signal line pair 41a is connected. The LVDS buffer 71 outputs a signal matching a potential difference between the signal line pair 41a, the potential difference being obtained by subtracting the potential at the inverted input terminal from the potential at the non-inverted input terminal.

Two types of threshold voltages, positive threshold voltage VTH+ and negative threshold voltage VTH−, are set in the LVDS buffer 71. If the voltage of the differential signal is equal to or higher than the positive threshold voltage VTH+, the LVDS buffer 71 outputs an H signal. If the voltage of the differential signal is equal to or lower than the negative threshold voltage VTH−, the LVDS buffer 71 outputs an L signal. The clock signal CLK, which is a serial signal output from the reception circuit 61a, is output to the shift register 62, command detection circuit 66, FIRE restoration circuit 67, and the like.

Although not illustrated, a capacitor used to deal with noise is connected across each signal line pair 41. A resistance-capacitance (RC) filter (low-pass filter) is formed from the capacitance of the capacitor, the resistance of the signal line pair 41, and the resistances of the terminating resistor 72 and the like. Therefore, a signal flowing in the signal line pair 41 responds at a speed matching the RC value (time constant) of the RC filter. That is, the waveform of the signal becomes unsharp according to the RC value.

The reception circuit 61b receives the waveform signal FIRE transmitted from the LVDS driver 122b through the signal line pair 41b, and outputs the received signal to the FIRE restoration circuit 67. The reception circuit 61c receives the waveform selection signal SIN and check signal CHECK transmitted from the LVDS driver 122c through the signal line pair 41c, and outputs these received signals to the shift register 62 and command detection circuit 66. The circuit structures of the reception circuits 61b and 61c are substantially the same as the structure of the reception circuit 61a, so their structures will not be described. In the description below, when the reception circuits 61a to 61c are not distinguished, they will be collectively referred to as the reception circuits 61.

The FIRE restoration circuit 67 acquires the waveform signal FIRE entered from the reception circuit 61b in response to the rising edge and falling edge of the clock signal CLK entered from the reception circuit 61a. The FIRE restoration circuit 67 then changes the signaling system of the acquired signal to convert it from serial to parallel and outputs the resulting parallel signal to the multiplexer 64.

The shift register 62 acquires the waveform selection signal SIN and check signal CHECK entered from the reception circuit 61c in response to the rising edge and falling edge of the clock signal CLK entered from the reception circuit 61a. The shift register 62 then changes the signaling system of these acquired signals to convert them from serial to parallel and outputs the resulting parallel signals to the latch circuit 63.

The latch circuit 63 is a so-called D flip-flop. The latch circuit 63 simultaneously outputs, to the multiplexer 64, the selection data included in the waveform selection signal SIN entered from the shift register 62, in synchronization with an STB signal, which will be described later. The latch circuit 63 also outputs, to the check circuit 69, the mode switching data nV_C included in the waveform selection signal SIN and check signal CHECK entered from the shift register 62, in synchronization with an STB signal.

The multiplexer 64 selects one from the six types of waveform data in the waveform signal FIRE entered from the FIRE restoration circuit 67, in response to the selection data entered from the latch circuit 63. The multiplexer 64 then outputs the selected waveform data to the drive buffer 65 as a waveform signal. The drive buffer 65 amplifies the waveform signal entered from the multiplexer 64 to create a driving signal. The drive buffer 65 then outputs the driving signal to all individual electrodes 89 in the piezoelectric actuator 86.

The command detection circuit 66 detects the STB creation signal included in the waveform selection signal SIN and check signal CHECK. The command detection circuit 66 includes a shift register 66a and a logical circuit 66b. The shift register 66a has the same bit length as the STB creation data. The shift register 66a acquires the waveform selection signal SIN and check signal CHECK entered from the reception circuit 61b in response to the rising edge and falling edge of the clock signal CLK entered from the reception circuit 61a. The shift register 66a then changes the signaling system of the acquired signals to convert them from serial to parallel and outputs the resulting parallel signals to the logical circuit 66b. If the logical circuit 66b receives, from the shift register 66a, a parallel signal in which the values of all bits are H, the logical circuit 66b outputs the STB signal to the latch circuit 63.

The temperature sensor 68 measures the temperature of the head 6, and outputs a temperature signal VTEMP with an analog voltage to the check circuit 69.

The check circuit 69 is connected to the output terminals of all reception circuits 61. The operation mode of the check circuit 69 is switched between a normal mode and an abnormality check mode, in response to the mode switching data nV_C entered from the latch circuit 63. Specifically, if the value of the bit of the mode switching data nV_C is L, the operation mode of the check circuit 69 becomes the normal mode. If the value of the bit is H, the operation mode becomes the abnormality check mode. That is, if the signal transmitted from the signal transmission and reception circuit 120 through the signal line pair 41c is the waveform selection signal SIN, the normal mode takes effect. If the signal is the check signal CHECK, the abnormality check mode takes effect.

In the normal mode, the check circuit 69 transmits the temperature signal VTEMP, which has been entered from the temperature sensor 68, to the signal transmission and reception circuit 120 through the signal line 44, as illustrated in FIG. 5C. In the abnormality check mode, the check circuit 69 transmits a detection signal, which is a detection result indicating whether there is an abnormality in data transfer, to the signal transmission and reception circuit 120 through the signal line 44. Specifically, if the signals entered from the output terminals of all reception circuits 61 are all an H signal or L signal, the check circuit 69 transmits an L signal as the detection signal. If at least one signal differs from the remaining signals, the check circuit 69 outputs a temperature signal VTEMP as the detection signal.

Abnormality check processing will be described below. Abnormality check processing is executed by the transmission control circuit 130 in the ASIC 105 to check whether there is an abnormality in data transfer.

The transmission control circuit 130 first controls the signal creation circuit 110 and signal transmission and reception circuit 120 to execute check signal transmission processing in which a check signal CHECK is transmitted to the driver IC 60 in synchronization with a clock signal CLK, before executing abnormality check processing. Thus, the operation mode of the check circuit 69 changes from the normal mode to the abnormality check mode.

In abnormality check processing, the transmission control circuit 130 first executes first input processing. In first input processing, the transmission control circuit 130 controls the signal transmission and reception circuit 120 so that an H signal is input to the non-inverted terminals of the LVDS buffers 71 of all reception circuits 61 and an L signal is input to their inverted terminals. If a differential signal has been received normally at all reception circuits 61, these reception circuits 61 output an H signal to the check circuit 69. Then, the check circuit 69 transmits an L signal to the signal transmission and reception circuit 120. If a differential signal has not been received normally at at least one reception circuit 61, no H signal is output from the reception circuit 61. In this case, the check circuit 69 transmits a temperature signal VTEMP to the signal transmission and reception circuit 120.

Therefore, if no L signal has been received from the check circuit 69, the transmission control circuit 130 decides that a differential signal has not been received normally at least any one of the reception circuits 61, that is, any signal line pair 41 has an abnormality such as breakage in the signal line connected to the non-inverted terminal of the LVDS buffer 71.

If an L signal has been received from the check circuit 69, the transmission control circuit 130 decides that, in all signal line pairs 41, the signal line connected to the non-inverted terminal of the LVDS buffer 71 is free from an abnormality. The transmission control circuit 130 then executes second input processing. In second input processing, the transmission control circuit 130 controls the signal transmission and reception circuit 120 so that an L signal is input to the non-inverted terminals of all reception circuits 61 and an H signal is input to their inverted terminals. If a differential signal has been received normally at all reception circuits 61, the check circuit 69 outputs an L signal to the signal transmission and reception circuit 120. If a differential signal has not been received normally at at least one reception circuit 61, the check circuit 69 transmits a temperature signal VTEMP to the signal transmission and reception circuit 120.

Therefore, if no L signal has been received from the check circuit 69, the transmission control circuit 130 decides that any signal line pair 41 has an abnormality such as breakage in the signal line connected to the inverted terminal of the LVDS buffer 71. If an L signal has been received from the check circuit 69, the transmission control circuit 130 decides that all signal line pairs 41 are free from an abnormality. When abnormality check processing is executed as described above, it is possible to check the signal line pair 41 for an abnormality such as breakage.

In a circuit such as the shift register 62, shift register 66a, or FIRE restoration circuit 67, to acquire data included in a signal such as the waveform selection signal SIN or waveform signal FIRE in synchronization with the clock signal CLK, the value of data to be acquired at the input terminal of the circuit needs to be held for a certain time (referred to below as the setup time) or longer before a clock edge of the clock signal CLK. Similarly, after the clock edge, the value of the data to be acquired at the input terminal needs to be held for a certain time (referred to below as the hold time) or longer. An example of acquiring, in the shift register 62, data included in the waveform selection signal SIN in synchronization with the rising edge of the clock signal CLK will be described below with reference to FIGS. 6A to 6C.

Figure 6A:
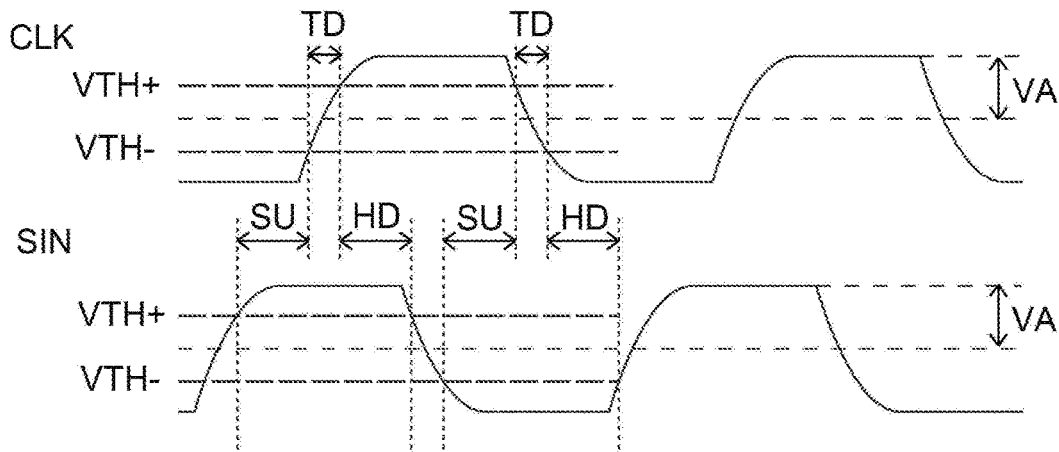
FIGS. 6A to 6C illustrate how a waveform selection signal synchronous with a clock signal is acquired in a shift register.

As illustrated in FIG. 6A, the data in the waveform selection signal SIN is held for a time SU before the rising edge of the clock signal CLK. The time SU starts from a time at which the voltage of the waveform selection signal SIN received at the reception circuit 61c changes from a value lower than the positive threshold voltage VTH+ to a value equal to or higher than the positive threshold voltage VTH+, and continues to a time at which the voltage of the clock signal CLK received at the reception circuit 61a changes from a value lower than the negative threshold voltage VTH− to a value equal to or higher than the negative threshold voltage VTH−.

After the clock signal CLK has been raised, the data in the waveform selection signal SIN is held for a time HD. The time HD starts from a time at which the voltage of the clock signal CLK received at the reception circuit 61a changes from a value lower than the positive threshold voltage VTH+ to a value equal to or higher than the positive threshold voltage VTH+, and continues to a time at which the voltage of the waveform selection signal SIN received at the reception circuit 61c changes from a value equal to or higher than the positive threshold voltage VTH+ to a value lower than the positive threshold voltage VTH+.

To accurately acquire the data in the waveform selection signal SIN in synchronization with the rising edge of the clock signal CLK, a condition needs to be satisfied; the condition (referred to below as the signal acquisition condition) is that the time SU is equal to or longer than the setup time and the time HD is equal to or longer than the hold time. That is, the data in the waveform selection signal SIN needs to be held at the input terminal of the shift register 62 for at least the total time of the setup time, the hold time, and a transition time TD from when the voltage of the clock signal CLK changes from the negative threshold voltage VTH− to the positive threshold voltage VTH+.

To satisfy the above signal acquisition condition, the waveform conditions for the clock signal CLK and waveform selection signal SIN are factory-set in the printer 1. These waveform conditions are each a condition related to a waveform used to transmit the clock signal CLK or waveform selection signal SIN from the LVDS driver 122 to the reception circuit 61 as the differential signal. Examples of the waveform condition include the phase of a signal and a driving current value (value of a current supplied from the constant-current circuit 121 to the LVDS driver 122) for a differential signal to be supplied from the LVDS driver 122.

However, even if the above signal acquisition condition has been satisfied before the printer 1 is shipped, the signal acquisition condition may not be satisfied depending on the environment in which the user uses the printer 1. For example, the resistance of the signal line pair 41 and the resistances of the terminating resistor 72 and the like become higher as temperature around them is raised. Therefore, the higher the temperature is, the larger the RC value (time constant) of the RC filter formed in the signal line pair 41 is. Therefore, the response of the differential signal to be received by the reception circuit 61 is slowed. Specifically, the waveform of the differential signal becomes unsharp, prolonging the transition time TD taken by the differential signal to change its voltage between the negative threshold voltage VTH− and the positive threshold voltage VTH+.

Figure 6B:
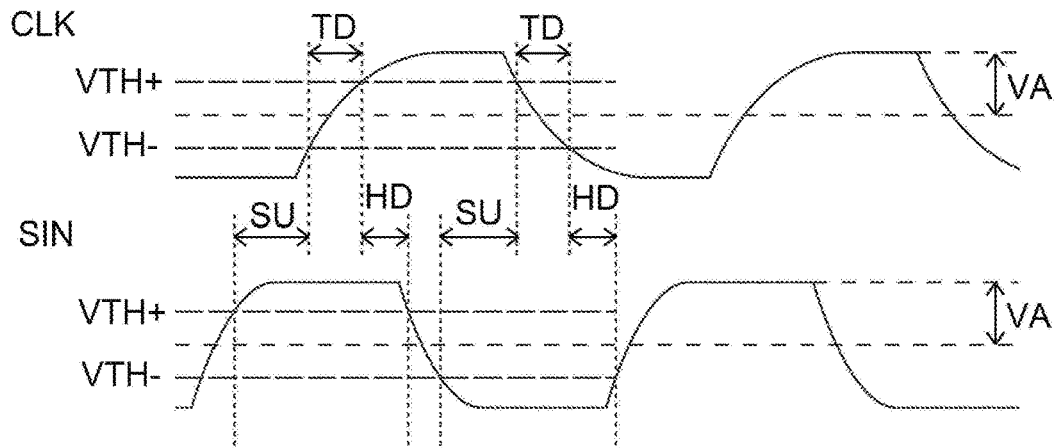

Particularly, the clock signal CLK, which often switches between the H signal and the L signal, is transmitted through the signal line pair 41a. To deal with noise, therefore, a capacitor having a large capacitance is connected across the signal line pair 41a, unlike the signal line pairs 41b and 41c through which the waveform selection signal SIN and waveform signal FIRE are transmitted. Under a high-temperature environment, therefore, the response of the clock signal CLK to be received by the reception circuit 61a is particularly slowed, as illustrated in FIG. 6B, so the waveform of the clock signal CLK becomes unsharp. For easy understanding in FIG. 6B, the waveform of only the clock signal CLK is unsharp due to a high temperature.

As described above, when the transition time TD taken by the clock signal CLK to be received by the reception circuit 61a is prolonged, the total time of the time SU and time HD is shortened by an according amount. In this case, the signal acquisition condition may be no longer satisfied. If the transition time TD taken by a differential signal is extremely prolonged, a next falling edge of the voltage of the differential signal may start before the voltage exceeds the positive threshold voltage VTH+ during the rising and the voltage may thereby start to drop.

As described above, a problem may arises in that the driver IC 60 fails to normally acquire the waveform selection signal SIN transmitted from the ASIC 105 depending on the environment in which the user uses the printer 1. A similar problem may also arises in that the FIRE restoration circuit 67 in the driver IC 60 fails to normally acquire the waveform signal FIRE transmitted from the ASIC 105.

When the voltage (amplitude VA of the waveform) of a differential signal such as the clock signal CLK is raised, the transition time TD is shortened. Therefore, it may also be considered that the current value of the driving current for the differential signal output by the LVDS driver 122 is kept at the maximum settable current value. Due to the characteristics of the LVDS buffer 71 and the like, however, there is a range for the voltage of the differential signal. If the current value of the driving current is set to the maximum settable current value, when the voltage of the differential signal is raised above or lowered below this recommended range, the LVDS buffer 71 or the like may fail depending on the usage environment. Therefore, the waveform conditions for the clock signal CLK, waveform selection signal SIN, and waveform signal FIRE need to be set according to the usage environment.

In this embodiment, therefore, the transmission control circuit 130 is configured so that it can execute waveform condition setting processing by controlling the signal creation circuit 110 and signal transmission and reception circuit 120. In waveform condition setting processing, a waveform condition is set for the clock signal CLK so that the driver IC 60 can normally acquire the waveform selection signal SIN and waveform signal FIRE. In this embodiment, the same condition is set as the waveform condition for the waveform signal FIRE and the waveform condition for the waveform selection signal SIN. Thus, when the driver IC 60 can normally acquire the waveform selection signal SIN, the driver IC 60 can also normally acquire the waveform signal FIRE. Therefore, the description below will mainly focus on the acquisition of the waveform selection signal SIN at the driver IC 60.

As mentioned above, the transmission control circuit 130 executes check signal transmission processing in which the check signal CHECK is transmitted to the driver IC 60, before executing abnormality check processing. When the driver IC 60 acquires the check signal CHECK, the operation mode of the check circuit 69 is switched from the normal mode to the abnormality check mode. If the driver IC 60 fails to normally acquire the check signal CHECK, the operation mode of the check circuit 69 is kept to the normal mode. When the operation mode of the check circuit 69 is kept to the normal mode, a signal output from the check circuit 69 in abnormality check processing is always the temperature signal VTEMP, regardless of whether the signal line pair 41 has an abnormality. If the driver IC 60 normally acquires the check signal CHECK, when the signal line pair 41 is free from an abnormality, a signal output from the check circuit 69 is an L signal.

Therefore, if the transmission control circuit 130 receives an L signal from the check circuit 69 in abnormality check processing, the transmission control circuit 130 can determine that the signal line pair 41 is free from an abnormality and that the driver IC 60 was capable of normally receiving the check signal CHECK. If the transmission control circuit 130 fails to receive an L signal in abnormality check processing, the transmission control circuit 130 can determine that at least any one of an abnormality in the signal line pair 41 and the inability of the driver IC 60 to normally acquire a check signal CHECK has occurred.

In waveform condition setting processing, therefore, the transmission control circuit 130 first controls the signal creation circuit 110 and signal transmission and reception circuit 120 to execute check signal transmission processing described above. In check signal transmission processing, a clock signal CLK is transmitted to the driver IC 60 under a reference waveform condition for the clock signal CLK and a check signal CHECK is transmitted to the driver IC 60 under a reference waveform condition for the waveform selection signal SIN in synchronization with the clock signal CLK. After that, the transmission control circuit 130 executes abnormality check processing. In abnormality check processing, the transmission control circuit 130 may not receive an L signal from the check circuit 69 and may thereby decide that there is an abnormality. In this case, although a possible cause of the abnormality may be attributable to an abnormality in the signal line pair 41, the transmission control circuit 130 executes waveform condition setting processing, assuming that the abnormality may be the inability of the driver IC 60 to normally acquire the check signal CHECK.

Figure 6C:
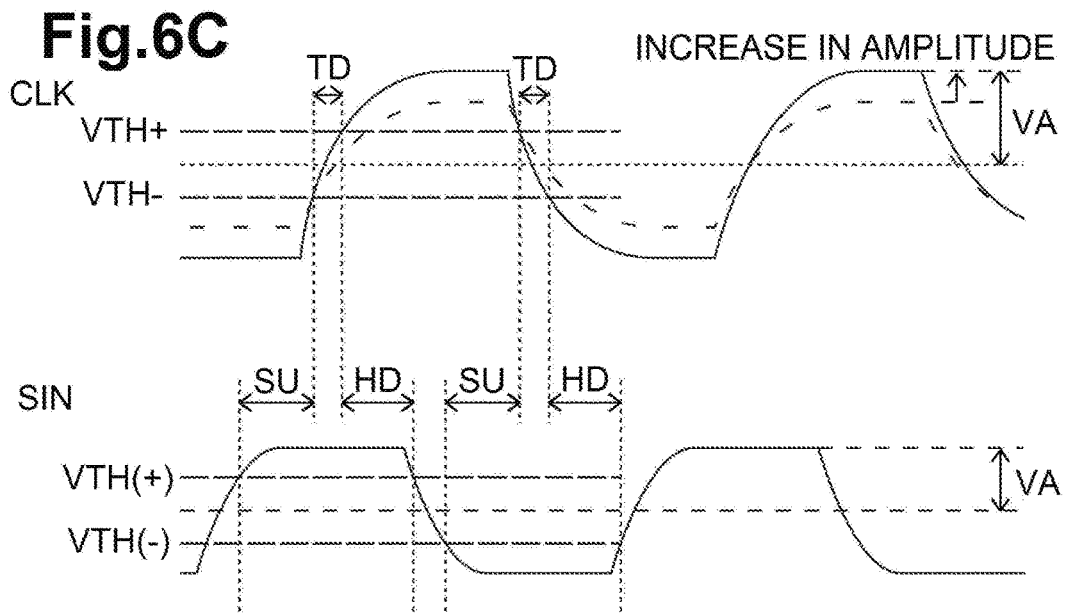

In this waveform condition setting processing, the transmission control circuit 130 changes the waveform condition for the clock signal CLK to a waveform condition under which the amplitude VA of the waveform of the clock signal CLK is increased and repeatedly executes check signal transmission processing and abnormality check processing until the transmission control circuit 130 decides that there is no abnormality in abnormality check processing. Thus, the amplitude VA of the waveform of the clock signal CLK to be received by the reception circuit 61 is increased, and the transition time TD taken by the clock signal CLK to change between the negative threshold voltage VTH− and the positive threshold voltage VTH+ is thereby shortened, as illustrated in FIG. 6C. If the transmission control circuit 130 decides that there is no abnormality in abnormality check processing, the transmission control circuit 130 executes data-transmission-time condition setting processing. In data-transmission-time condition setting processing, according to the waveform condition for the clock signal CLK at that time, the transmission control circuit 130 sets a waveform condition, for the clock signal CLK, that is used when the waveform selection signal SIN is to be transmitted (the waveform condition will be referred to below as the data-transmission-time waveform condition). Accordingly, it is possible to reduce the possibility that the driver IC 60 fails to acquire the waveform selection signal SIN. The above waveform condition setting processing will be described below in more detail.

As illustrated in FIG. 3, the non-volatile memory 104 stores a waveform condition table 104a, waveform condition change information 104b, check-signal-transmission-time waveform condition information 104c, a waveform condition setting history table 104d, data-transmission-time waveform condition setting information 104e, data-transmission-time waveform condition information 104f, and other information related to waveform condition setting processing.

As illustrated in FIG. 5D, the waveform condition table 104a stores waveform conditions that can be set for the waveform selection signal SIN and clock signal CLK. In this embodiment, one SIN waveform condition, which is used as a reference, is stored for the waveform selection signal SIN. For the clock signal CLK, ten types of waveform conditions denoted 1 to 10 (referred to below as CLK waveform conditions 1 to 10) are stored. CLK waveform conditions 1 to 10 correspond to 10 levels of current values that the constant-current circuit 121 can output. That is, under CLK waveform conditions 1 to 10, the driving currents (currents supplied from the constant-current circuit 121) for differential signals output from the LVDS driver 122 are mutually different. In the same environment, therefore, the waveforms of clock signals CLK corresponding to different CLK waveform conditions have mutually different amplitudes.

As for CLK waveform conditions 1 to 10, the larger the number following "CLK waveform condition" is, the larger the driving current is. That is, the driving current for CLK waveform condition 1 is smallest, and the driving current for CLK waveform condition 10 is largest. In the same environment, therefore, as a CLK waveform condition has a larger number after "CLK waveform condition", the waveform of the clock signal CLK has a larger amplitude VA.

As mentioned above, among the values of currents at a plurality of levels that the constant-current circuit 121 can output, a difference between the value of a current at any one level and the value of a current at a next level is constant. Therefore, among the ten types of CLK waveform conditions, a difference in amplitude between any one waveform condition and a next waveform condition is constant. That is, an amount by which the amplitude VA of the waveform of the clock signal CLK is increased is the same between when the CLK waveform condition for the clock signal CLK is changed from CLK waveform condition 1 to CLK waveform condition 2 and when the CLK waveform condition is changed from CLK waveform condition 2 to CLK waveform condition 3. Other conditions for CLK waveform conditions 1 to 10, such as the phase, other than the driving current are the same.

The waveform condition change information 104b is used in waveform condition change processing in which the CLK waveform condition for the clock signal CLK is changed. In this embodiment, the waveform condition change information 104b is used to change a CLK waveform condition to one of the ten types of CLK waveform conditions 1 to 10 in the waveform condition table 104a so that the new driving current becomes one level higher than the old driving current. If the CLK waveform condition to be changed for the clock signal CLK is, for example, CLK waveform condition 3, the new CLK waveform condition is CLK waveform condition 4. Under each CLK waveform condition, the amplitude of the waveform of the clock signal CLK is increased by the same amount when the CLK waveform condition is changed.

The check-signal-transmission-time waveform condition information 104c indicates a CLK waveform condition used in the execution of check signal transmission processing. In an initial state, the check-signal-transmission-time waveform condition information 104c indicates CLK waveform signal 1 corresponding to the smallest driving current. When the CLK waveform condition is changed in waveform condition change processing, the check-signal-transmission-time waveform condition information 104c is changed to information indicating the new CLK waveform condition.

The waveform condition setting history table 104d mutually relates a CLK waveform condition (referred to below as the signal acquisition waveform condition) at the time of the normal acquisition of the check signal CHECK by the driver IC 60, temperature data, and obtaining-time information, as illustrated in FIG. 5E. Temperature data is obtained by the transmission control circuit 130 according to the temperature signal VTEMP received from the driver IC 60. This temperature data is at least any one of the temperature of the head 6 and a parameter having a correlation to the temperature. Obtaining-time information indicates information about a date and time measured by an internal clock (not illustrated) when the driver IC 60 can normally acquire a check signal CHECK.

The transmission control circuit 130 executes obtaining processing when the printer 1 is powered on or print processing is terminated. In obtaining processing, the transmission control circuit 130 obtains temperature data in response to the temperature signal VTEMP received from the driver IC 60. The transmission control circuit 130 then decides whether the waveform condition setting history table 104*d* includes approximate temperature data, which is temperature data for which a difference between its value and the value of the obtained temperature data is smaller than a predetermined value. Only when the transmission control circuit 130 determines that the waveform condition setting history table 104*d* includes no approximate temperature data, the transmission control circuit 130 assumes that the current environment in which the printer 1 is used differs from the previous environment and thereby executes waveform condition setting processing. If, however, the transmission control circuit 130 determines that the waveform condition setting history table 104*d* includes approximate temperature data, the transmission control circuit 130 sets a data-transmission-time waveform condition according to the CLK waveform condition related to the approximate temperature data. As described above, when setting a data-transmission-time waveform condition, the transmission control circuit 130 selects either a method in which waveform condition setting processing is executed to set the data-transmission-time waveform condition or a method in which the data-transmission-time waveform condition is set according to a CLK condition stored in the waveform condition setting history table 104*d*, depending on whether approximate temperature data is present in the waveform condition setting history table 104*d*. The transmission control circuit 130 then sets the data-transmission-time waveform condition in the selected setting method.

If the transmission control circuit 130 decides, in abnormality check processing in this waveform condition setting processing, that the check signal CHECK has been acquired normally by the driver IC 60, the transmission control circuit 130 stores, in the waveform condition setting history table 104*d*, the current CLK waveform condition indicated in the check-signal-transmission-time waveform condition information 104*c* as the signal acquisition waveform condition, in relation to the temperature data and obtaining-time information.

Data-transmission-time waveform condition setting information 104*e* is used in data-transmission-time condition setting processing in which a data-transmission-time waveform condition is set according to a signal acquisition waveform condition. This data-transmission-time waveform condition setting information 104*e* is used to set a data-transmission-time waveform condition to a CLK waveform condition under which the amplitude VA of the clock signal CLK becomes larger than under the signal acquisition waveform condition. Thus, when the waveform selection signal SIN is transmitted from the signal transmission and reception circuit 120 to the driver IC 60, the driver IC 60 can reliably acquire the waveform selection signal SIN.

In this embodiment, the data-transmission-time waveform condition setting information 104*e* is used to change a data-transmission-time waveform condition to one of the ten types of CLK waveform conditions 1 to 10 in the waveform condition table 104*a* so that the new driving current becomes two levels higher than the old driving current under the signal acquisition waveform condition. At each change of the CLK waveform condition in waveform condition change processing, therefore, an amount by which the amplitude VA of the waveform of the clock signal CLK is increased between this signal acquisition waveform condition and the data-transmission-time waveform condition is larger than an amount by which the amplitude VA of the waveform of the clock signal CLK is increased. As a result, the driver IC 60 can more reliably acquire the waveform selection signal SIN.

When the signal acquisition waveform condition is CLK waveform condition 9, there is no CLK waveform condition under which the driving current becomes two levels higher. In this case, therefore, the data-transmission-time waveform condition is set to CLK waveform condition 10. When the signal acquisition waveform condition is CLK waveform condition 10, the data-transmission-time waveform condition is set to CLK waveform condition 10.

The data-transmission-time waveform condition information 104*f* indicates the data-transmission-time waveform condition that has been set in waveform condition setting processing.

An example of the operation of the transmission control circuit 130 will be described with reference to FIG. 7.

When the printer 1 is powered on (S1), the transmission control circuit 130 executes obtaining processing to obtain temperature data according to the temperature signal VTEMP received from the driver IC 60 (S2). The transmission control circuit 130 then references the waveform condition setting history table 104*d* in the non-volatile memory 104, and decides whether the waveform condition setting history table 104*d* stores approximate temperature data for which a difference between its value and the value of the obtained temperature data is smaller than a predetermined value (S3). If the transmission control circuit 130 decides that such approximate temperature data is not stored (the result in S3 is No), the transmission control circuit 130 decides that waveform condition setting processing needs to be executed and proceeds to processing in S6.

If the transmission control circuit 130 decides that such approximate temperature data is stored (the result in S3 is Yes), the transmission control circuit 130 decides whether a time elapsed from the acquisition time indicated in obtaining-time information related to the approximate temperature data is equal to or longer than a predetermined time (S4). The resistance of each signal line pair 41, the resistances of the terminating resistor 72 and the like, the characteristics of elements such as the capacitor connected across the signal line pair 41 change with time. Therefore, the RC value of the RC filter formed in the signal line pair 41 and the like may change. When this happens, even if a data-transmission-time waveform condition is set according to the CLK waveform condition related to approximate temperature data, the driver IC 60 may not be capable of acquiring the waveform selection signal SIN. Therefore, if the transmission control circuit 130 decides that the time elapsed from the acquisition time is equal to or longer than the predetermined time (the result in S4 is Yes), the transmission control circuit 130 decides that waveform condition setting processing needs to be executed and proceeds to processing in S6.

If the transmission control circuit 130 decides that the time elapsed from the acquisition time is shorter than the predetermined time (the result in S4 is No), the transmission control circuit 130 decides that waveform condition setting processing does not need to be executed. In this case, the transmission control circuit 130 uses the CLK waveform condition related to the approximate temperature data as the signal acquisition waveform condition and sets a data-transmission-time waveform condition according to the signal acquisition waveform condition and data-transmission-time waveform condition setting information 104*e* (S5). Thus, the data-transmission-time waveform condition becomes a waveform condition under which the amplitude VA of the clock signal CLK becomes larger than under the signal acquisition waveform condition. At that time, the data-transmission-time waveform condition information 104*f* is updated to information that indicates the newly set data-transmission-time waveform condition. Upon the completion of the processing in S5, the transmission control circuit 130 proceeds to processing in S8.

Figure 8:
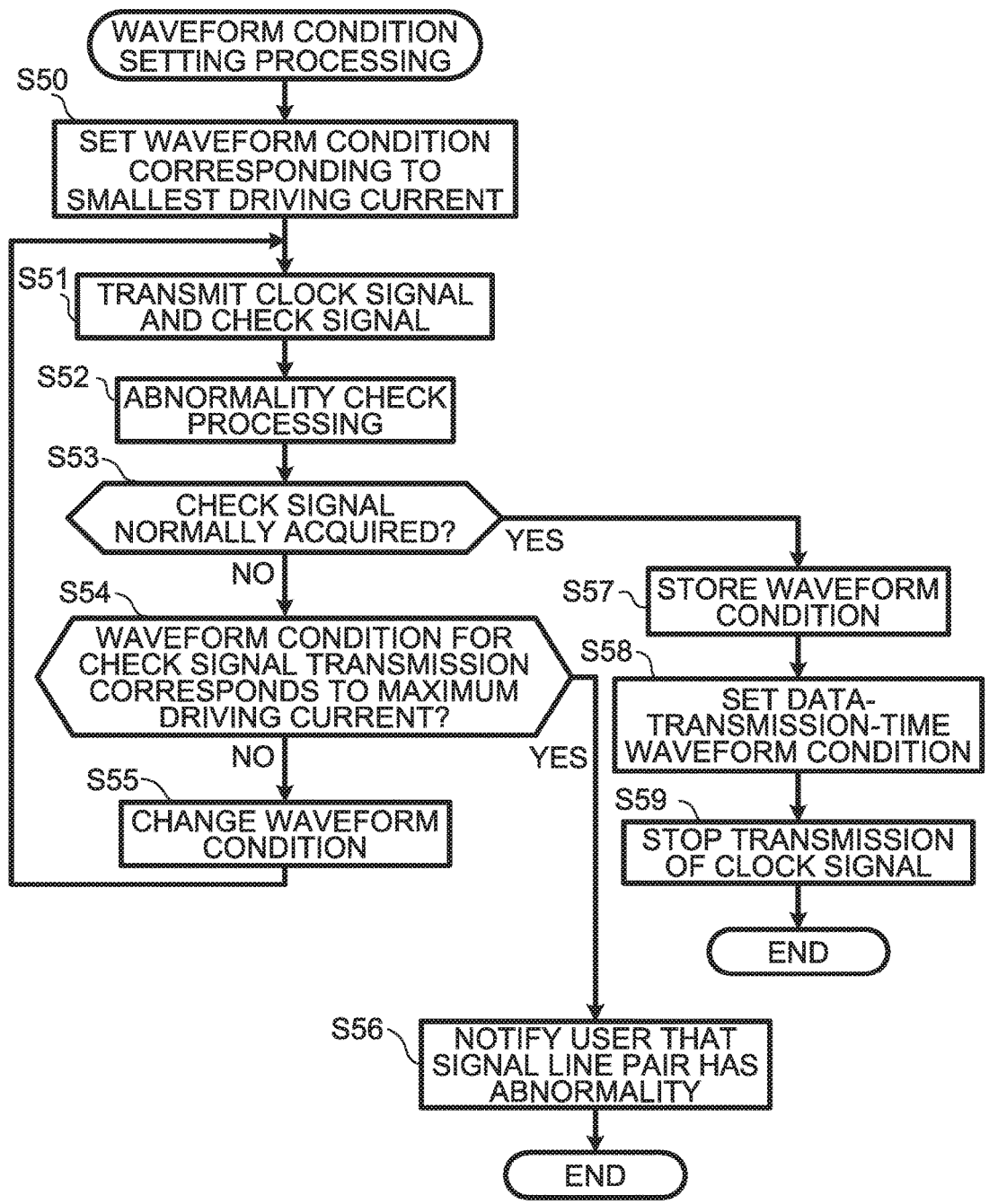
FIG. 8 is a flowchart illustrating waveform condition setting processing.

In processing in S6, the transmission control circuit 130 starts waveform condition setting processing, which will be described later with reference to FIG. 8. If the waveform condition setting processing is terminated without a print command being received from an external apparatus during the execution of waveform condition setting processing (the result in S7 is No), the transmission control circuit 130 proceeds to processing in S8.

In processing in S8, the transmission control circuit 130 decides whether a print command has been received from an external apparatus. If the transmission control circuit 130 decides that a print command has been received from an external apparatus (the result in S8 is Yes), the transmission control circuit 130 executes print processing in response to the print command (S9). Specifically, the transmission control circuit 130 controls the signal creation circuit 110 to create a waveform selection signal SIN from image data. The transmission control circuit 130 then controls the signal transmission and reception circuit 120 to transmit a clock signal CLK to the driver IC 60 under the data-transmission-time waveform condition indicated in the data-transmission-time waveform condition information 104f, and also transmits the waveform selection signal SIN and waveform signal FIRE to the driver IC 60 under the SIN waveform condition. Thus, ink is expelled from the nozzles 8. Upon the completion of this print processing, the transmission control circuit 130 stops the transmission of the clock signal CLK, after which the transmission control circuit 130 returns to the processing in S2 and starts waveform condition setting processing in S6 as necessary.

If, in the processing in S7, the transmission control circuit 130 receives a print command from an external apparatus during the execution of waveform condition setting processing (the result in S7 is Yes), the transmission control circuit 130 decides whether to continue or suspend the waveform condition setting processing. To make this decision, the transmission control circuit 130 infers a print time, taken to execute print processing, according to the contents of the print command, image data eligible for printing, and the like (S10). To shorten a time from the reception of a print command to the start of print processing (this time is called first printout time (FPOT)), it is preferable to suspend the waveform condition setting processing and execute print processing. If, however, a long print time is taken in the print processing, even if the time from the reception of a print command to the start of print processing is prolonged a little, there is almost no influence on ease of use by the user.

Therefore, the transmission control circuit 130 decides whether the inferred print time is equal to or longer than a predetermined threshold time (S11). If the transmission control circuit 130 decides that the inferred print time is equal to or longer than the predetermined threshold time (the result in S11 is Yes), the transmission control circuit 130 continues to execute the waveform condition setting processing and sets a data-transmission-time waveform condition (S12). After that, the transmission control circuit 130 executes print processing in response to the print command (S9). Upon the completion of the print processing, the transmission control circuit 130 stops the transmission of the clock signal CLK, after which the transmission control circuit 130 returns to the processing in S2 and starts waveform condition setting processing in S6 as necessary.

If the transmission control circuit 130 decides that the inferred print time is shorter than the predetermined threshold time (the result in S11 is No), the transmission control circuit 130 suspends the waveform condition setting processing (S13). The transmission control circuit 130 then references the waveform condition setting history table 104d and extracts a waveform condition related to the temperature data closest to the temperature data obtained in the processing in S2 (this waveform condition will be referred to as the close waveform condition) as the signal acquisition waveform condition. The transmission control circuit 130 sets a data-transmission-time waveform condition according to the extracted close waveform condition and the data-transmission-time waveform condition setting information 104e to update the data-transmission-time waveform condition information 104f (S14).

If the data-transmission-time waveform condition is a close waveform condition, the driver IC 60 may not be capable of acquiring the waveform selection signal SIN because a decision has not been made as to whether the check signal CHECK can be normally acquired under the close waveform condition. However, as described above, a data-transmission-time waveform condition is set to a waveform condition under which the amplitude VA of the clock signal CLK becomes larger than under this close waveform condition, according to the data-transmission-time waveform condition setting information 104e. Therefore, the possibility that the driver IC 60 fails to acquire a waveform selection signal SIN is reduced. The waveform condition setting history table 104d may include both a high-temperature waveform condition related to temperature data corresponding to a temperature higher than the temperature for the obtained temperature data and a low-temperature waveform condition related to temperature data corresponding to a temperature lower than the temperature for the obtained temperature data. In this case, as the signal acquisition waveform condition, the transmission control circuit 130 may extract the high-temperature waveform condition or low-temperature waveform condition, whichever corresponds to a larger driving current. Therefore, the possibility that the driver IC 60 fails to acquire the waveform selection signal SIN can be further reduced. In addition, as a variation, a waveform condition corresponding to the obtained temperature data may be inferred according to a waveform condition stored in the data-transmission-time waveform condition setting information 104e, and the inferred waveform condition may be used as the signal acquisition waveform condition. There may be a case in which no waveform condition is stored in the data-transmission-time waveform condition setting information 104e or there is a large difference between the value of temperature data stored in relation to a waveform condition and the value of temperature data obtained in S2. In this case, CLK waveform condition 10 corresponding to the largest driving current may be set as the data-transmission-time waveform condition.

After the processing in S14, the transmission control circuit 130 executes print processing in response to the print command (S15). Upon the completion of this print processing, the transmission control circuit 130 returns to the processing in S6, where the transmission control circuit 130 resumes waveform condition setting processing from the previously suspended processing.

Next, waveform condition setting processing will be described with reference to FIG. 8.

First, the transmission control circuit 130 sets CLK waveform condition 1 corresponding to the smallest driving current in the check-signal-transmission-time waveform condition information 104c (S50). After that, the transmission control circuit 130 controls the signal creation circuit 110 and signal transmission and reception circuit 120 to execute check signal transmission processing. In check signal transmission processing, a check signal CHECK is transmitted under the SIN waveform condition stored in the waveform condition table 104*a* and a clock signal CLK is transmitted under a CLK waveform condition indicated in the check-signal-transmission-time waveform condition information 104*c* (S51).

Next, the transmission control circuit 130 controls the signal transmission and reception circuit 120 to execute abnormality check processing (S52). If the transmission control circuit 130 fails to receive an L signal from the check circuit 69 and thereby does not decide that the check signal CHECK has been normally acquired (the result in S53 is No), the transmission control circuit 130 decides whether the CLK waveform condition indicated in the check-signal-transmission-time waveform condition information 104*c* is CLK waveform condition 10 under which the driving current is maximized (S54). If the transmission control circuit 130 decides that the CLK waveform condition is not CLK waveform condition 10 (the result in S54 is No), the transmission control circuit 130 changes the CLK waveform condition indicated in the check-signal-transmission-time waveform condition information 104*c* to a CLK waveform condition under which the driving current becomes one level higher, according to the waveform condition change information 104*b* (S55). After that, the transmission control circuit 130 returns to the processing in S51. Then, the check signal transmission processing in S51 and the abnormality check processing in S52 will be executed again under the new CLK waveform condition.

If, in processing in S54, the transmission control circuit 130 decides that the CLK waveform condition indicated in the check-signal-transmission-time waveform condition information 104*c* is CLK waveform condition 10 (the result in S54 is Yes), the transmission control circuit 130 decides that the signal line pair 41 has an abnormality and notifies the user of the abnormality through a touch panel (not illustrated). After that, the transmission control circuit 130 does not transmit a check signal CHECK, a waveform selection signal SIN, and the like to the driver IC 60 until the abnormality is eliminated.

If, in abnormality check processing in S52, the transmission control circuit 130 receives an L signal from the check circuit 69 and thereby decides that the check signal CHECK has been normally acquired (the result in S53 is Yes), the transmission control circuit 130 executes storage processing. In storage processing, the transmission control circuit 130 stores, in the waveform condition setting history table 104*d*, the CLK waveform condition indicated in the check-signal-transmission-time waveform condition information 104*c* as the signal acquisition waveform condition, in relation to the temperature data obtained in the processing in S2 and to obtained-date-and-time information obtained from information about a date-and-time measured by the internal clock (S57).

After that, the transmission control circuit 130 executes data-transmission-time condition setting processing, in which a data-transmission-time waveform condition is set, according to the above signal acquisition waveform condition and data-transmission-time waveform condition setting information 104*e* (S58). Accordingly, the data-transmission-time waveform condition becomes a waveform condition under which the amplitude VA of the clock signal CLK becomes larger than under the signal acquisition waveform condition. At that time, the data-transmission-time waveform condition information 104*f* is updated to information that indicates the newly set data-transmission-time waveform condition. The transmission control circuit 130 then controls the signal transmission and reception circuit 120 to stop the transmission of the check signal CHECK and clock signal CLK (S59). In this embodiment, therefore, only when print processing is to be executed or waveform condition setting processing needs to be executed, a clock signal CLK is transmitted from the signal transmission and reception circuit 120 to the driver IC 60. This can suppress the power consumption of the printer 1. Upon the completion of the processing in S59, the processing described above is terminated.

According to this embodiment, if the driver IC 60 fails to normally acquire a check signal CHECK, the CLK waveform condition for the clock signal CLK is changed. This can reduce the possibility that the driver IC 60 fails to acquire a waveform selection signal SIN.

In the embodiment described above: the signal transmission and reception circuit 120 is equivalent to the transmitter in the present invention; the driver IC 60 is equivalent to the receiver and driver in the present invention; the transmission control circuit 130 is equivalent to the controller in the present invention; the waveform selection signal SIN is equivalent to the data signal in the present invention; the signal line pair 41*a* is equivalent to the clock signal line in the present invention; the signal line pair 41*b* is equivalent to the data signal line in the present invention; the L signal transmitted from the check circuit 69 to the signal transmission and reception circuit 120 is equivalent to the acquisition signal in the present invention; the head 6 is equivalent to the head in the present invention; and the temperature sensor 68 is equivalent to the temperature sensor in the present invention.

So far, a preferred embodiment of the present invention has been described, but the present invention is not limited to the above embodiment. Various changes are possible within the scope of the claims. In waveform condition setting processing in the embodiment described above, for example, the clock signal CLK has been used as the target signal, and a CLK waveform condition has been set as a data-transmission-time waveform condition. However, the waveform selection signal SIN may be used as the target signal, and a SIN waveform condition may be set as a data-transmission-time waveform condition. Alternatively, both the clock signal CLK and waveform selection signal SIN may be used as target signals, and data-transmission-time waveform conditions may be set accordingly.

In abnormality check processing, a decision may not be made for an abnormality in the signal line pair 41, but a decision may be made only for the inability of the driver IC 60 to normally acquire a check signal CHECK. Specifically, the check circuit 69 may be structured so that when mode switching data nV_C entered from the latch circuit 63 is L, the check circuit 69 outputs a temperature signal VTEMP and that when mode switching data nV_C is H, the check circuit 69 outputs an L signal. The transmission control circuit 130 may decide whether a check signal CHECK has been normally acquired depending on whether the L signal has been received.

Although the temperature sensor 68 has been provided in the driver IC 60, this is not a particular limitation. The temperature sensor 68 may be provided in another place in the printer 1. Although the LVDS method has been used to transfer data from the signal transmission and reception circuit 120 to the driver IC 60, this is not a particular limitation. For example, a single-end method may be used.

In waveform condition change processing, check signal transmission processing and abnormality check processing have been repeatedly executed with different CLK waveform conditions until the driver IC 60 normally acquires a check signal CHECK. However, the disclosure is not limited in this. If the driver IC 60 fails to acquire a check signal CHECK in first check signal transmission processing, a clock signal CLK may be transmitted under CLK waveform condition 10 corresponding to the largest driving current in second check signal transmission processing. The waveform condition table 104a may not be provided. In this case, in waveform condition change processing, the waveform condition change information 104b, for example, may be information according to which the driving current is increased by a predetermined amount from the value before the change. At least part of the waveform conditions in the waveform condition setting history table 104d may be stored in advance at the factory.

In waveform condition change processing in the above embodiment, a CLK waveform condition has been changed to a waveform condition under which the amplitude of the waveform of the clock signal CLK is increased when compared with the amplitude before the change. However, this is not a particular limitation. For example, waveform condition change processing may be processing to change the phase (the amount of skew between the clock signal CLK and the waveform selection signal SIN) of the clock signal CLK. Alternatively, waveform condition change processing may be processing to change a CLK waveform condition to a waveform condition under which the high-frequency component of the clock signal CLK is enhanced by a predetermined amount (so-called pre-emphasis is carried out) from the value before the change. In these cases as well, the times SU and HD change, so there may be a case in which the driver IC 60 can normally acquire a waveform selection signal SIN.

The transmission control circuit 130 may be structured so that it always executes waveform condition setting processing at the timing when the printer 1 is powered on and at the timing when print processing is terminated. Alternatively, the transmission control circuit 130 may be structured so that it always executes waveform condition setting processing only at any one of these timings. Alternatively, the transmission control circuit 130 may execute waveform condition setting processing at other timing. For example, the transmission control circuit 130 may execute waveform condition setting processing in response to a command entered by the user through a touch panel or the like. Alternatively, the transmission control circuit 130 may execute obtaining processing to obtain temperature data at intervals of a fixed time, and may execute waveform condition setting processing when the value of the obtained temperature data differs, by a predetermined value or more, from the value of any of the temperature data stored in the waveform condition setting history table 104d.

In waveform condition setting processing in the above embodiment, the CLK waveform condition for the clock signal CLK in the first check signal transmission processing has been CLK waveform condition 1 corresponding to the smallest driving current. However, this is not a particular limitation. For example, the waveform condition setting history table 104d may be referenced to find the CLK waveform condition related to the temperature data closest to the obtained temperature data, and the found CLK waveform condition may be set as the CLK waveform condition in the first check signal transmission processing.

The printer 1 has been a so-called serial printer that performs printing on a paper sheet P while moving the head 6 in a direction crossing the direction in which the paper sheet P is fed. However, the printer 1 may be a so-called line printer that performs printing on a paper sheet P fed by the feeding mechanism 7 with the head fixed. The communication device in the present invention has been mounted in the printer 1. However, this is not a limitation. The communication device can be applied to various apparatuses. For example, the communication device in the present invention may be applied to a liquid crystal apparatus or the like in which data transmission is performed between a controller and a display device.

What is claimed is:

1. A communication device comprising:
   a transmitter;
   a receiver configured to receive a confirmation signal transmitted from the transmitter, the receiver further configured to transmit an acquisition signal toward the transmitter if receiving the confirmation signal;
   a clock signal line connecting the transmitter to the receiver, the clock signal line through which a clock signal is transmitted from the transmitter toward the receiver;
   a data signal line connecting the transmitter to the receiver, the data signal line through which a data signal is transmitted from the transmitter toward the receiver;
   a memory configured to store a plurality of clock waveform conditions related to a waveform of the clock signal, one or more data waveform conditions related to a waveform of the data signal, and condition change information for changing at least one of the plurality of clock waveform conditions and at least one of the one or more data waveform conditions; and
   a controller configured to:
      during setting at least one of the clock signal to one of the plurality of clock waveform conditions and the data signal to a data waveform condition among the one or more data waveform conditions, control the transmitter to transmit the clock signal and the confirmation signal, where at least one of the clock signal and the confirmation signal is transmitted at a reference waveform condition;
      determine whether the transmitter receives the acquisition signal transmitted from the receiver;
      if the transmitter does not receive the acquisition signal, control the transmitter to transmit the clock signal and the confirmation signal using a different waveform condition for the at least one of the clock signal and the confirmation signal; and
      if the transmitter receives the acquisition signal, update the condition change information.

2. The communication device according to claim 1, wherein each of the plurality of clock waveform conditions has a different amplitude from each other, and wherein the controller is further configured to set the condition change information for the clock signal, whereby, when a print data is received, the clock signal is transmitted under one of the plurality of clock waveform conditions having a greater amplitude than a clock waveform condition that is resulted in receiving the acquisition signal.

3. The communication device according to claim 2, wherein the confirmation signal is transmitted at the reference waveform condition.

4. The communication device according to claim 1,
wherein the plurality of clock waveform conditions comprise a first clock waveform condition and a second clock waveform condition,
wherein an amplitude of the second clock waveform condition is greater than an amplitude of the first clock waveform condition, and
wherein the clock signal is transmitted at the first clock waveform condition.

5. The communication device according to claim 4,
wherein the different waveform condition is the second clock waveform condition, and
wherein the clock signal is transmitted at the second clock waveform condition.

6. The communication device according to claim 1,
wherein, until determining the receiver receives the acquisition signal, the controller is configured to repeatedly:
change at least one of waveform condition for transmitting the clock signal and the confirmation signal;
control the transmitter to transmit the clock signal and the confirmation signal under the at least one changed waveform condition toward the receiver; and
determine whether the transmitter receives the acquisition signal transmitted from the receiver.

7. The communication device according to claim 1,
wherein the plurality of clock waveform conditions have different amplitudes from each other and each of differences between the plurality of clock waveform conditions is a predetermined interval,
wherein the controller is further configured to, if determining the transmitter receives the acquisition signal responsive to the transmission of the confirmation signal transmitted along with the clock signal transmitted under one clock waveform condition of the plurality of waveform conditions, set the clock signal to another clock waveform condition of the plurality of clock waveform conditions other than the one clock waveform condition,
wherein a first amplitude of the clock signal transmitted under the another clock waveform condition is greater than a second amplitude of the clock signal under the one clock waveform condition, and
wherein a difference between the first amplitude and the second amplitude is greater than the predetermined interval.

8. The communication device according to claim 1, further comprising a temperature sensor,
wherein the controller is further configured to acquire temperature information based on the temperature sensor,
wherein the memory is further configured to store waveform condition information related to a relationship between the temperature information and one of the plurality of clock waveform conditions and the data waveform condition among the one or more data waveform conditions, and
wherein the controller is further configured to:
determine whether approximation temperature information is stored in the memory, a stored temperature information being determined to be the approximation temperature information where a difference between the acquired temperature information and the stored temperature information is less than a predetermined temperature amount;
set at least one of the clock signal and the data signal, if determining the approximation temperature information is not stored in the memory; and
set at least one of the clock signal to one of the plurality of clock waveform conditions and the data signal to the data waveform condition among the one or more data waveform conditions based on the approximation temperature information stored in the memory, if determining the approximation temperature information is stored in the memory.

9. The communication device according to claim 8,
wherein the memory is further configured to store a plurality of pieces of the waveform condition information each related to a relationship between the temperature information and one of the plurality of clock waveform conditions and the data waveform condition among the one or more data waveform conditions, and
wherein, if a smallest difference is greater than or equal to the predetermined temperature amount, the smallest difference being a difference between the acquired temperature information and the temperature condition information in each of the plurality of pieces of the waveform condition information,
the controller is further configured to set the waveform condition for at least one of the clock signal and the data signal.

10. The communication device according to claim 8,
wherein, when setting at least one of the clock signal to one of the plurality of clock waveform conditions and the data signal to the data waveform condition among the one or more data waveform conditions, the controller is further configured to cause the memory to store at least one of the plurality of clock waveform conditions and one of the one or more data waveform conditions related to the temperature information as the waveform condition information, one of the plurality of clock waveform conditions being a clock waveform condition used for the transmission of the clock signal that is resulted in the acquisition signal being received, the data waveform condition among the one or more data waveform conditions being a waveform condition of the confirmation signal that is resulted in the acquisition signal being received.

11. The communication device according to claim 10,
wherein the waveform condition information further comprises setting time information,
wherein the controller is further configured to:
cause the memory to store the setting time information, the setting time information being related to a setting time point when setting at least one of the clock signal to one of the plurality of clock waveform conditions and the data signal to the data waveform condition among the one or more data waveform conditions; and
set at least one of the clock signal to one of the plurality of clock waveform conditions and the data signal to the data waveform condition among the one or more data waveform conditions, if determining the approximation temperature information is stored in the memory and if elapsed time elapsed from the setting time point indicating the setting time information related to the approximation temperature information is greater than or equal to a predetermined time.

12. The communication device according to claim 1,
wherein each of the clock signal line and the data signal line includes one signal line pair, and wherein the controller is further configured to control the transmitter to transmit each of the clock signal and the data signal as differential signal toward the receiver via a respective one signal line pair.

13. The communication device according to claim 12, wherein the receiver includes a respective terminating resistor for converting current passed through each of the one signal line pair to voltage.

14. The communication device according to claim 1, further comprising a second data signal line connected the transmitter to the receiver.

15. The communication device according to claim 1, wherein the receiver is configured to transmit the acquisition signal toward the transmitter via the data signal line, and
wherein the transmitter is configured to transmit the confirmation signal toward the receiver via the data signal line.

16. A communication device comprising:
a transmitter;
a receiver configured to receive a confirmation signal transmitted from the transmitter, the receiver further configured to transmit an acquisition signal toward the transmitter if receiving the confirmation signal;
a clock signal line connecting the transmitter to the receiver, the clock signal line through which a clock signal is transmitted from the transmitter toward the receiver;
a data signal line connecting the transmitter to the receiver, the data signal line through which a data signal is transmitted from the transmitter toward the receiver;
a memory configured to store one or more clock waveform conditions related to a waveform of the clock signal, a plurality of data waveform conditions related to a waveform of the data signal, and condition change information for changing at least one of the one or more clock waveform conditions and at least one of the plurality of data waveform conditions; and
a controller configured to:
during setting at least one of the clock signal to a clock waveform condition among the one or more clock waveform conditions, respectively and the data signal to one of the plurality of data waveform conditions,
control the transmitter to transmit the clock signal and the confirmation signal, where at least one of the clock signal and the confirmation signal is transmitted at a reference waveform condition;
determine whether the transmitter receives the acquisition signal transmitted from the receiver;
if the transmitter does not receive the acquisition signal, control the transmitter to transmit the data signal and the confirmation signal using a different waveform condition for at least one of the clock signal and the confirmation signal; and
if the transmitter receives the acquisition signal, update the condition change information.

17. A printer comprising:
a head including a recording element;
a transmitter;
a driver configured to receive a confirmation signal transmitted from the transmitter, the driver further configured to transmit an acquisition signal toward the transmitter if receiving the confirmation signal, the driver further configured to drive the recording element in one of a plurality of drive modes;
a clock signal line connecting the transmitter to the driver, the clock signal line through which a clock signal is transmitted from the transmitter toward the driver;
a data signal line connecting the transmitter to the driver, the data signal line through which a data signal is transmitted from the transmitter toward the driver;
a memory configured to store a plurality of clock waveform conditions related to a waveform of the clock signal, one or more data waveform conditions related to a waveform of the data signal, and condition change information for changing at least one of the plurality of clock waveform conditions and at least one of the one or more data waveform conditions; and
a controller configured to:
generate a select signal for selecting one of the plurality of drive modes based on recording data related to an image recorded on a recorded medium by the head; and
control the transmitter to transmit the generated select signal as the data signal toward the driver,
wherein the controller is further configured to:
during setting at least one of the clock signal to one of the plurality of clock waveform conditions, respectively, and the data signal to a data waveform condition among the one or more data waveform conditions, control the transmitter to transmit the clock signal and the confirmation signal, where at least one of the clock signal and the confirmation signal is transmitted at a reference waveform condition;
determine whether the transmitter receives the acquisition signal transmitted from the driver;
if the transmitter does not receive the acquisition signal, control the transmitter to transmit the clock signal and the confirmation signal using a different waveform condition for at least one of the clock signal and the confirmation signal; and
if the transmitter receives the acquisition signal, update the condition change information.

18. The printer according to claim 17, wherein the controller is further configured to control the transmitter to transmit the clock signal toward the driver, if controlling the transmitter to transmit the select signal toward the driver or if setting at least one of the clock signal to one of the plurality of clock waveform conditions and the data signal to one of the one or more of data waveform conditions.

19. The printer according to claim 17, wherein, at least one of when the printer is turned on and when a completion of recording the image on the recorded medium, the controller is configured to set at least one of the clock signal to one of the plurality of clock waveform conditions and the data signal to the data waveform condition among the one or more data waveform conditions.

20. The printer according to claim 17, wherein the controller is further configured to:
determine whether a recording time for recording an image corresponding to the recording command on the recorded medium is greater than or equal to a threshold time, if receiving a recording command based on the recording data; and
set at least one of the clock signal to one of the plurality of clock waveform conditions, respectively, and the data signal to the data waveform condition among the one or more data waveform conditions, if the recording time is greater than or equal to the threshold time and before controlling the transmitter to transmit the select signal toward the driver.

21. The printer according to claim 17, further comprising a second data signal line connected the transmitter to the driver,
- wherein the head further includes a nozzle configured to eject an ink droplet,
- wherein the driver is further configured to drive the head to eject a plurality of volumes of the ink droplet from the nozzle, and
- wherein the controller is further configured to:
  - generate a select volume signal for selecting one of the plurality of volumes of the ink droplet based on the recording data related to the image recorded on the recorded medium by the head; and
  - control the transmitter to transmit the generated select volume signal toward the driver via the second data signal line.

* * * * *